(12) United States Patent  
Kamijo

(10) Patent No.: US 6,998,900 B2  
(45) Date of Patent: Feb. 14, 2006

(54) BOOSTER CIRCUIT, SEMICONDUCTOR DEVICE, AND DISPLAY DEVICE

(75) Inventor: Haruo Kamijo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 39 days.

(21) Appl. No.: 10/852,209

(22) Filed: May 25, 2004

(65) Prior Publication Data

US 2005/0007184 A1     Jan. 13, 2005

(30) Foreign Application Priority Data

Jun. 19, 2003  (JP) .............................. 2003-175318

(51) Int. Cl.  
    G05F 1/10     (2006.01)
(52) U.S. Cl. ....................................... 327/536
(58) Field of Classification Search ................ 327/530, 327/534, 535, 536, 537; 363/59, 60  
See application file for complete search history.

(56) References Cited

U.S. PATENT DOCUMENTS

| | | | | |
|---|---|---|---|---|
| 5,581,454 A | * | 12/1996 | Collins | .................... 363/59 |
| 5,768,116 A | * | 6/1998 | Kompelien | .................... 363/59 |
| 6,459,330 B1 | | 10/2002 | Yasue | |
| 6,657,875 B1 | * | 12/2003 | Zeng et al. | .................... 363/59 |
| 6,836,176 B1 | * | 12/2004 | Zeng et al. | ................. 327/535 |
| 2005/0007185 A1 | | 1/2005 | Kamijo | |
| 2005/0007186 A1 | | 1/2005 | Kamijo | |
| 2005/0012739 A1 | | 1/2005 | Kamijo | |

FOREIGN PATENT DOCUMENTS

| | | |
|---|---|---|
| JP | A 6-351229 | 12/1994 |
| JP | A 2000-330085 | 11/2000 |
| JP | A 2001-211635 | 8/2001 |

* cited by examiner

*Primary Examiner*—Jeffrey Zweizig  
(74) *Attorney, Agent, or Firm*—Oliff & Berridge, PLC

(57) ABSTRACT

A booster circuit includes: first to M-th power supply lines (M is an integer greater than three); first to (M−2)th boost capacitors, the j-th boost capacitor ($1 \leq j \leq M-2$, j is an integer) being connected between the j-th power supply line and the (j+1)th power supply line in a first period, and connected between the (j+1)th power supply line and the (j+2)th power supply line in a second period which is subsequent to the first period; and first to (M−3)th stabilization capacitors, the k-th stabilization capacitor ($1 \leq k \leq M-3$, k is an integer) being connected between the (k+1)th power supply line and the (k+2)th power supply line, and storing an electric charge discharged from the k-th boost capacitor in the second period.

18 Claims, 18 Drawing Sheets

BOOSTER CIRCUIT, SEMICONDUCTOR DEVICE, AND DISPLAY DEVICE

Japanese Patent Application No. 2003-175318, filed on Jun. 19, 2003, is hereby incorporated by reference in its entirety.

BACKGROUND OF THE INVENTION

The present invention relates to a booster circuit, a semiconductor device, and a display device.

A liquid crystal display device including an electro-optical device may be used as a display device. The size and current consumption of an electronic instrument can be reduced by providing a liquid crystal display device in the electronic instrument.

A high voltage is necessary for driving the liquid crystal display device. Therefore, it is preferable that a driver integrated circuit (IC) (semiconductor device in a broad sense) which drives the electro-optical device includes a power supply circuit which generates a high voltage from the viewpoint of cost. In this case, the power supply circuit includes a booster circuit. The booster circuit generates an output voltage Vout for driving a liquid crystal by boosting a voltage between a high-potential-side system power supply voltage VDD and a low-potential-side ground power supply voltage VSS.

BRIEF SUMMARY OF THE INVENTION

One aspect of the present invention relates to a booster circuit including a plurality of capacitors, and the booster circuit comprises:

first to M-th power supply lines (M is an integer greater than three);

first to (M−2)th boost capacitors, the j-th boost capacitor ($1 \leq j \leq M-2$, j is an integer) being connected between the j-th power supply line and the (j+1)th power supply line in a first period, and connected between the (j+1)th power supply line and the (j+2)th power supply line in a second period which is subsequent to the first period; and first to (M−3)th stabilization capacitors, the k-th stabilization capacitor ($1 \leq k \leq M-3$, k is an integer) being connected between the (k+1)th power supply line and the (k+2)th power supply line, and storing an electric charge discharged from the k-th boost capacitor in the second period, wherein a voltage obtained by multiplying a voltage between the first and second power supply lines (M−1) times is output between the first and M-th power supply lines.

Another aspect of the present invention relates to a booster circuit including a plurality of capacitors, and the booster circuit comprises:

first to N-th power supply lines (N is an integer greater than two);

first to 2N-th switching elements, one end of the first switching element being connected with the first power supply line, one end of the 2N-th switching element being connected with the (N+1)th power supply line, and the switching elements other than the first and 2N-th switching elements being connected in series between the other end of the first switching element and the other end of the 2N-th switching element;

first to (N−1)th boost capacitors, one end of each of the boost capacitors being connected with a j-th connection node ($1 \leq j \leq 2N-3$, j is an odd number) to which the j-th and (j+1)th switching elements are connected, and the other end of the boost capacitor being connected with a (j+2)th connection node to which the (j+2)th and (j+3)th switching elements are connected; and first to (N−2)th stabilization capacitors, one end of each of the stabilization capacitors being connected with a k-th connection node ($2 \leq k \leq 2N-4$, k is an even number) to which the k-th and (k+1)th switching elements are connected, and the other end of the stabilization capacitor being connected with a (k+2)th connection node to which the (k+2)th and (k+3)th switching elements are connected, wherein the switching elements are controlled so that one of the m-th switching element ($1 \leq m \leq 2N-1$, m is an integer) and the (m+1)th switching element is turned on, and a voltage obtained by multiplying a voltage between the first and second power supply lines N times is output between the first and (N+1)th power supply lines.

A further aspect of the present invention relates to a semiconductor device including a plurality of capacitors, and the semiconductor device comprises:

first to N-th power supply lines (N is an integer greater than two);

first to 2N-th switching elements, one end of the first switching element being connected with the first power supply line, one end of the 2N-th switching element being connected with the (N+1)th power supply line, and the switching elements other than the first and 2N-th switching elements being connected in series between the other end of the first switching element and the other end of the 2N-th switching element;

first to (N−1)th boost capacitors, one end of each of the boost capacitors being connected with a j-th connection node ($1 \leq j \leq 2N-3$, j is an odd number) to which the j-th and (j+1)th switching elements are connected, and the other end of the boost capacitor being connected with a (j+2)th connection node to which the (j+2)th and (j+3)th switching elements are connected; and first to (N−2)th stabilization capacitors, one end of each of the stabilization capacitors being connected with a k-th connection node ($2 \leq k \leq 2N-4$, k is an even number) to which the k-th and (k+1)th switching elements are connected, and the other end of the stabilization capacitor being connected with a (k+2)th connection node to which the (k+2)th and (k+3)th switching elements are connected, wherein the switching elements are controlled so that one of the m-th switching element ($1 \leq m \leq 2N-1$, m is an integer) and the (m+1)th switching element is turned on.

A still further aspect of the present invention relates to a display device, comprising:

a plurality of scan lines;
a plurality of data lines;
a plurality of pixels;
a scan driver which drives the scan lines; and
the above semiconductor device which drives the data lines.

DETAILED DESCRIPTION OF THE EMBODIMENT

Figure 1:
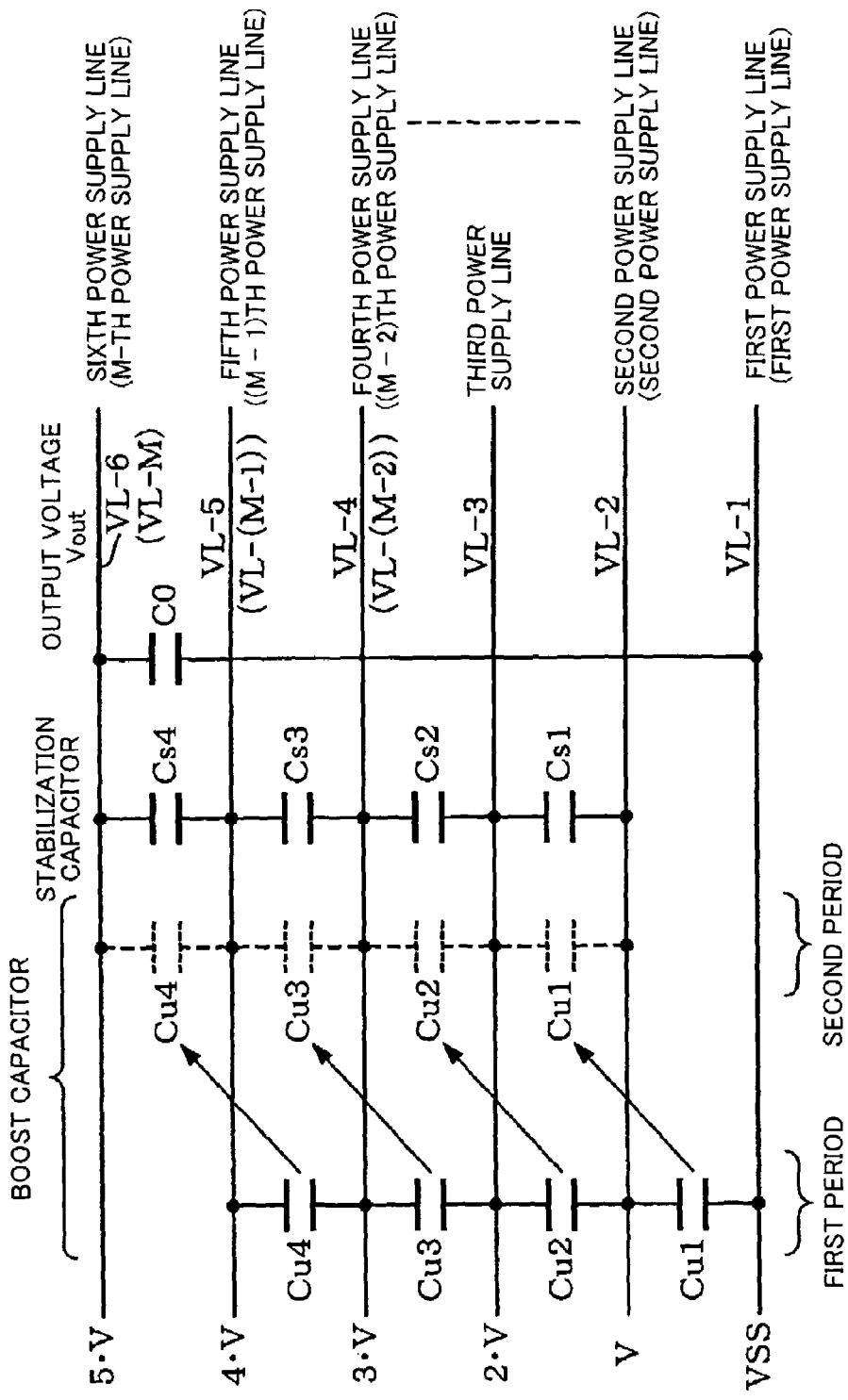
FIG. 1 is illustrative of an operation principle of a booster circuit in an embodiment of the present invention.

Embodiments of the present invention are described below. Note that the embodiments described hereunder do not in any way limit the scope of the invention defined by the claims laid out herein. Note also that all of the elements described below should not be taken as essential requirements for the present invention.

A reduction of power consumption can be achieved by using a charge-pump circuit which generates a voltage boosted by using a charge-pump method as a booster circuit. The charge-pump circuit includes capacitors. In a liquid crystal panel module including a liquid crystal panel and a driver IC, a mounting step can be simplified and the total cost can be reduced by providing the capacitors of the charge-pump circuit in the IC. Since five capacitors are necessary for a conventional charge-pump circuit which boosts voltage by multiplying the voltage five times, it is advantageous to provide the capacitors in the IC from the above viewpoint.

However, in the case where the capacitor of the charge-pump circuit is provided in the driver IC, the area of the capacitor included in the charge-pump is increased in order to obtain the same capacitance as that of an external capacitor, thereby increasing cost. On the other hand, current consumption is increased by reducing the area of the built-in capacitor,. Therefore, the area of the built-in capacitor and current consumption have an inconsistent relationship.

Therefore, in order to reduce cost by reducing the area of the capacitor, a charge-pump type booster circuit having the same capability (charge supply capability and load drive capability) as that of a conventional booster circuit by using a small-capacity capacitor is demanded. In other words, a charge-pump type booster circuit which has the same capability as that of a conventional booster circuit including a capacitor while maintaining the area of the capacitor the same (same cost), and which can further reduce current consumption is demanded.

The capacitance of one capacitor provided outside the IC is 0.1 to 1 $\mu$F, and the capacitance of one capacitor provided in the IC is about 1 nF. Therefore, in order to obtain the same capability as that of a conventional booster circuit which does not include a capacitor, it is necessary to increase the switching frequency of the switching element of the charge-pump circuit. This increases current consumption due to an increase in the charge/discharge current of the capacitor. Therefore, a charge-pump circuit which reduces the charge/discharge current of the capacitor is demanded.

According to the following embodiments, a booster circuit which reduces power consumption without reducing the load drive capability, and a semiconductor device and a display device including the same can be provided.

The embodiments of the present invention are described below in detail with reference to the drawings.

1. Booster Circuit

A booster circuit in the present embodiment includes a plurality of capacitors, and outputs a voltage boosted by using a charge-pump method.

FIG. 1 shows an explanatory diagram of the operation principle of the booster circuit in the present embodiment. The booster circuit in the present embodiment includes first to M-th power supply lines VL-1 to VL-M (M is an integer greater than three). The booster circuit outputs a boosted voltage (M−1)×V obtained by multiplying a voltage V between the first and second power supply lines VL-1 and VL-2 (M−1) times to the M-th power supply line VL-M as an output voltage Vout. FIG. 1 shows the operation principle when M is six (when multiplying voltage five times).

The booster circuit includes first to (M−2)th boost capacitors Cu1 to Cu(M−2), and first to (M−3)th stabilization capacitors Cs1 to Cs(M−3).

The j-th boost capacitor Cuj (1≦j≦M−2, j is an integer) among the first to (M−2)th boost capacitors Cu1 to Cu(M−2) is connected between the j-th power supply line and the (j+1)th power supply line in a first period. The j-th boost capacitor Cuj is connected between the (j+1)th power supply line and the (j+2)th power supply line in a second period subsequent to the first period. Specifically, the power supply lines connected with the j-th boost capacitor Cuj are changed corresponding to the first and second periods.

For example, the first boost capacitor Cu1 is connected between the first and second power supply lines VL-1 and VL-2 in the first period, and is connected between the second and third power supply lines VL-2 and VL-3 in the second period. The second boost capacitor Cu2 is connected between the second and third power supply lines VL-2 and VL-3 in the first period, and is connected between the third and fourth power supply lines VL-3 and VL-4 in the second period. The (M−2)th boost capacitor Cu(M−2) is connected between the (M−2)th and (M−1)th power supply lines VL-(M−2) and VL-(M−1) in the first period, and is connected between the (M−1)th and M-th power supply lines VL-(M−1) and VL-M in the second period.

The k-th stabilization capacitor Csk ($1 \leq k \leq M-3$, k is an integer) among the first to (M−3)th stabilization capacitors Cs1 to Cs(M−3) is connected between the (k+1)th power supply line and the (k+2)th power supply line. The k-th stabilization capacitor Csk stores (is charged with) an electric charge discharged from the k-th boost capacitor Cuk in the second period. Specifically, the power supply lines connected with the k-th stabilization capacitor Csk are common in the first and second periods.

For example, the first stabilization capacitor Cs1 is connected between the second and third power supply lines VL-2 and VL-3. The first stabilization capacitor Cs1 stores an electric charge discharged from the first boost capacitor Cu1 in the second period. The first stabilization capacitor Cs1 is connected between the second and third power supply lines VL-2 and VL-3 in the second period. The second stabilization capacitor Cs2 is connected between the third and fourth power supply lines VL-3 and VL-4. The second stabilization capacitor Cs2 stores an electric charge discharged from the second boost capacitor Cu2 in the second period. The (M−3)th stabilization capacitor Cs(M−3) is connected between the (M−2)th and (M−1)th power supply lines VL-(M−2) and V-(M−1). The (M−3)th stabilization capacitor Cs(M−3) stores an electric charge discharged from the (M−3)th boost capacitor Cu(M−3) in the second period.

The principle operation of the booster circuit is described below taking the case where M is six as shown in FIG. 1 as an example. A low-potential-side ground power supply voltage VSS is supplied to the first power supply line VL-1. A high-potential-side system power supply voltage VDD is supplied to the second power supply line VL-2. The voltage V is applied between the first and second power supply lines VL-1 and VL-2.

In the first period, the voltage V is applied to the first boost capacitor Cu1. In the second period subsequent to the first period, the first boost capacitor Cu1 is connected between the second and third power supply lines VL-2 and VL-3. Therefore, an electric charge stored in the first boost capacitor Cu1 in the first period is discharged and stored in the first stabilization capacitor Cs1. This causes the third power supply line VL-3 to which one end of the first stabilization capacitor Cs1 is connected to be at a voltage 2×V with respect to the voltage V of the second power supply line VL-2 to which the other end of the first stabilization capacitor Cs1 is connected.

An electric charge stored in second and third boost capacitors Cu2 and Cu3 in the first period is discharged in the second period and stored in the second and third stabilization capacitors Cs2 and Cs3, respectively.

As a result, the voltages of the fourth to sixth power supply lines VL-4 to VL-6 respectively become 3×V, 4×V, and 5×V. Specifically, the voltage 5×V is applied between the first and sixth power supply lines VL-1 and VL-6 as the output voltage of the booster circuit.

The booster circuit preferably further includes an (M−2)th stabilization capacitor Cs(M−2) connected between the (M−1)th power supply line VL-(M−1) and the M-th power supply line VL-M, and the (M−2)th stabilization capacitor Cs(M−2) preferably stores an electric charge discharged from the (M−2)th boost capacitor Cu(M−2) in the second period. Specifically, it is preferable that a fourth stabilization capacitor Cs4 be further connected between the fifth and sixth power supply lines VL-5 and VL-6 when M is six. In FIG. 1, the fourth stabilization capacitor Cs4 corresponding to the (M−2)th stabilization capacitor Cs(M−2) is connected.

In this case, the output voltage Vout boosted in the second period can be supplied in a stable state by the fourth stabilization capacitor Cs4.

In FIG. 1, the booster circuit preferably further includes a capacitor connected between the first power supply line VL-1 and the M-th power supply line VL-M. Specifically, it is preferable that a capacitor be connected between the first and sixth power supply lines VL-1 and VL-6 when M is six. In FIG. 1, a capacitor C0 is connected between the first and sixth power supply lines VL-1 and VL-6 corresponding to the first and M-th power supply lines VL-1 and VL-M, respectively. In this case, a decrease in the voltage level due to the load connected with the sixth power supply line VL-6 can be prevented.

Figure 2:
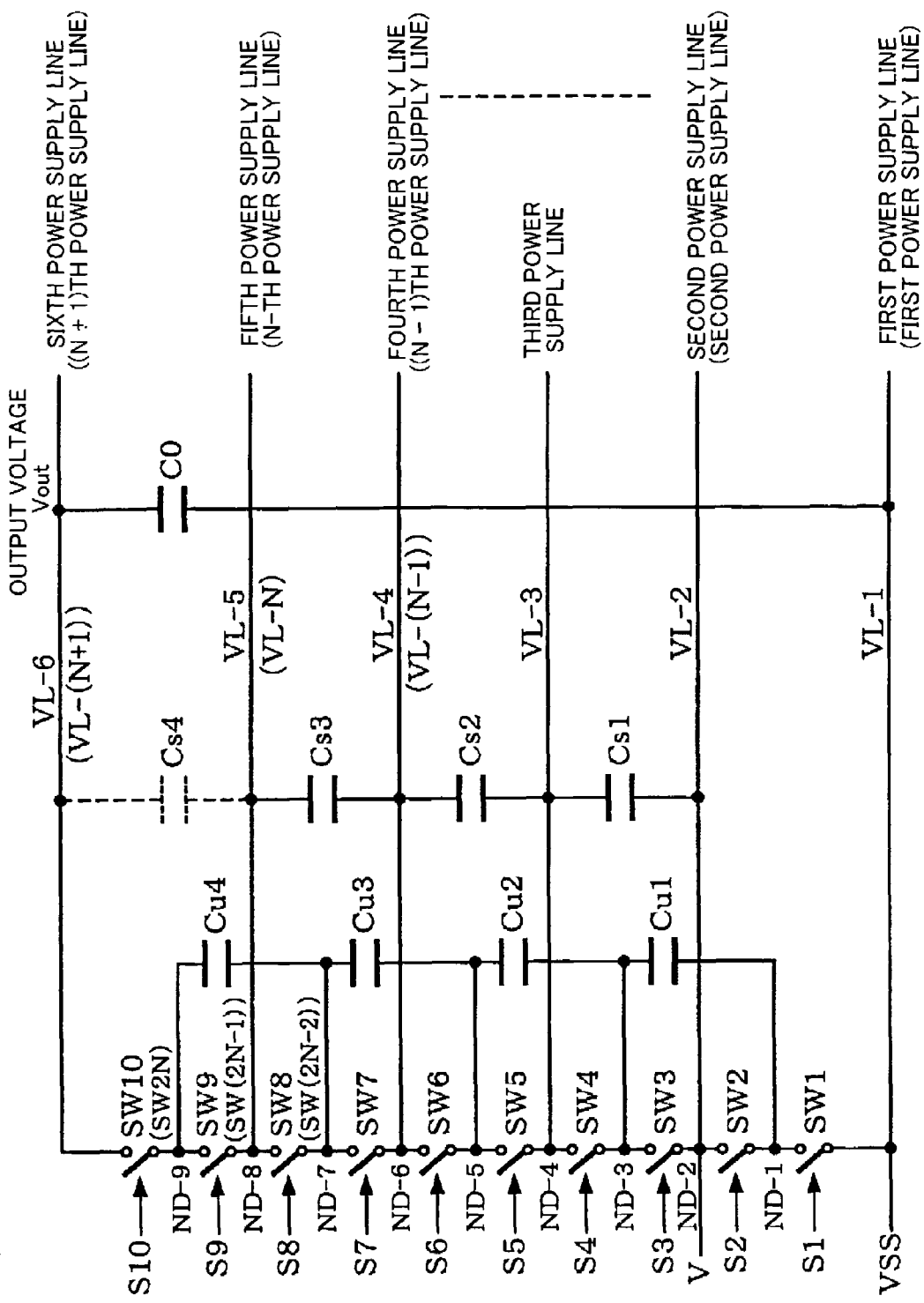
FIG. 2 is a configuration diagram of a configuration example of the booster circuit shown in FIG. 1.

FIG. 2 shows a configuration example of the booster circuit shown in FIG. 1. In the booster circuit shown in FIG. 2, the power supply lines connected with each boost capacitor in the first and second periods are changed by controlling switching elements so that one of two switching elements connected in series between two power supply lines is turned on.

The booster circuit shown in FIG. 2 includes the first to (N+1)th power supply lines VL-1 to VL-(N+1) (N is an integer greater than two). The booster circuit outputs a boosted voltage N×V obtained by multiplying the voltage V between the first and second power supply lines VL-1 and VL-2 N times to the (N+1)th power supply line VL-(N+1) as the output voltage Vout. FIG. 2 shows the configuration example when N is five (when multiplying voltage five times).

The booster circuit includes first to 2N-th switching elements SW1 to SW2N, first to (N−1)th boost capacitors Cu1 to Cu(N−1), and first to (N−2)th stabilization capacitors Cs1 to Cs(N−2).

The first to 2N-th switching elements are connected in series between the first and (N+1)th power supply lines VL-1 and VL-(N+1). In more detail, one end of the first switching element SW1 is connected with the first power supply line VL-1, and one end of the 2N-th switching element SW2N is connected with the (N+1)th power supply line VL-(N+1). The remaining switching elements SW2 to SW(2N−1) excluding the first and 2N-th switching elements SW1 and SW2N are connected in series between the other end of the first switching element SW1 and the other end of the 2N-th switching element SW2N.

One end of each of the first to (N−1)th boost capacitors Cu1 to Cu(N−1) is connected with a j-th connection node ND-j ($1 \leq j \leq 2N-3$, j is an odd number) to which the j-th and (j+1)th switching elements SWj and SW(j+1) are connected. The other end of the boost capacitor is connected with the (j+2)th connection node ND-(j+2) to which the (j+2)th and (j+3)th switching elements SW(j+2) and SW(j+3) are connected.

Specifically, the first boost capacitor Cu1 is connected between the first and third connection nodes ND-1 and ND-3. The first connection node ND-1 is a node to which the first and second switching elements SW1 and SW2 are connected, and the third connection node ND-3 is a node to which the third and fourth switching elements SW3 and SW4 are connected. The second boost capacitor Cu2 is connected between the third and fifth connection nodes ND-3 and ND-5. The fifth connection node ND-5 is a node to which the fifth and sixth switching elements SW5 and SW6 are connected. The (N−1)th boost capacitor Cu(N−1) is connected between the (2N−3)th and (2N−1)th connection nodes ND-(2N−3) and ND-(2N−1). The (2N−3)th connection node ND-(2N−3) is a node to which the (2N−3)th and (2N−2)th switching elements SW(2N−3) and SW(2N−2) are connected, and the (2N−1)th connection node ND-(2N−1) is a node to which the (2N−1)th and 2N-th switching elements SW(2N−1) and SW2N are connected.

In FIG. 2, one end of each of the first to (N−2)th stabilization capacitors Cs1 to Cs(N−2) is connected with the k-th connection node ND-k ($2 \leq k \leq 2N-4$, k is an even number) to which the k-th and (k+1)th switching elements SWk and SW(k+1) are connected. The other end of the stabilization capacitor is connected with the (k+2)th connection node ND-(k+2) to which the (k+2)th and (k+3)th switching elements SW(k+2) and SW(k+3) are connected.

Specifically, the first stabilization capacitor Cs1 is connected between the second and fourth connection nodes ND-2 and ND-4. The second connection node ND-2 is a node to which the second and third switching elements SW2 and SW3 are connected, and the fourth connection node ND-4 is a node to which the fourth and fifth switching elements SW4 and SW5 are connected. The second stabilization capacitor Cs2 is connected between the fourth and sixth connection nodes ND-4 and ND-6. The sixth connection node ND-6 is a node to which the sixth and seventh switching elements SW6 and SW7 are connected. The (N−2)th stabilization capacitor Cs(N−2) is connected between the (2N−4)th and (2N−2)th connection nodes ND-(2N−4) and ND-(2N−2). The (2N−4)th connection node ND-(2N−4) is a node to which the (2N−4)th and (2N−3)th switching elements SW(2N−4) and SW(2N−3) are connected, and the (2N−2)th connection node ND-(2N−2) is a node to which the (2N−2)th and (2N−1)th switching elements SW(2N−2) and SW(2N−1) are connected.

In the booster circuit shown in FIG. 2, the switching elements are switch-controlled so that one of the m-th switching element SWm ($1 \leq m \leq 2N-1$, m is an integer) and the (m+1)th switching element SW(m+1) is turned on, and the voltage N×V obtained by multiplying the voltage between the first and second power supply lines N times is output between the first and (N+1)th power supply lines VL-1 and VL-(N+1).

Figure 3:
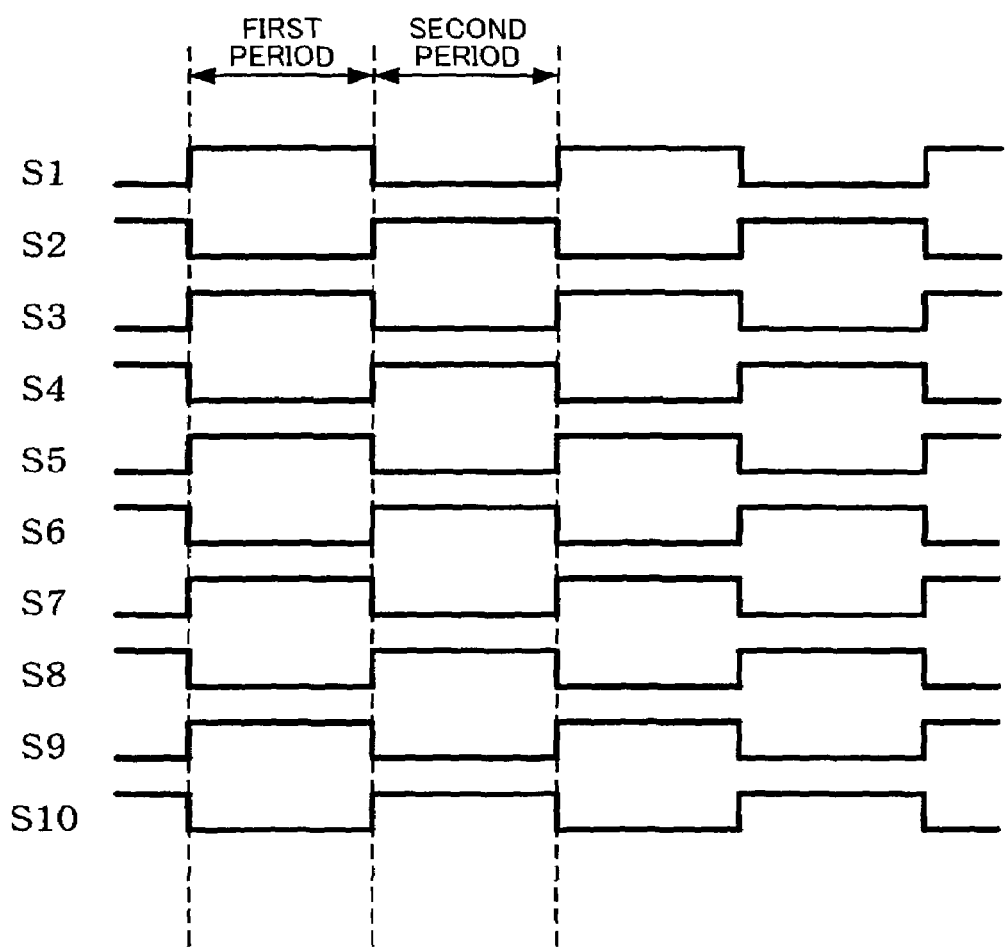
FIG. 3 is a timing diagram schematically showing an operation of a switch control signal shown in FIG. 2.

FIG. 3 schematically shows an operation of a switch control signal which switch-controls each switching element shown in FIG. 2.

In FIG. 3, a switch control signal which switch-controls (on/off controls) the first switching element SW1 is denoted by S1, a switch control signal which switch-controls the second switching element SW2 is denoted by S2, and a switch control signal which switch-controls the 2N-th switching element SW2N is denoted by S2N. FIG. 3 schematically shows operation timing of the switch control signals S1 to S10 when N is five. The switch control signal is a clock signal which repeats the movement shown in FIG. 3.

The switching element is turned on by the switch control signal at an H level, whereby both ends of the switching element are electrically connected and the switching element is in a conducting state. The switching element is turned off by the switch control signal at an L level, whereby both ends of the switching element are electrically disconnected and the switching element is in a nonconducting state.

The switch control signals S1, S3, . . . , and S9 are set at an H level in the first period, and set at an L level in the second period. The switch control signals S2, S4, . . . , and S10 are set at an L level in the first period, and set at an H level in the second period. The switching elements are switch-controlled in this manner so that one of the m-th switching element SWm and the (m+1)th switching element SW(m+1) is turned on.

It is preferable that the switching elements be switch-controlled so that a period in which the m-th switching element SWm and the (m+1)th switching element SW(m+1) are turned on at the same time does not exist. This is because current consumption is increased due to shoot-through current if the m-th switching element SWm and the (m+1)th switching element SW(m+1) are turned on at the same time. In FIG. 3, the second period is a period immediately after the first period. However, the present invention is not limited thereto. For example, the second period may start when a predetermined period has elapsed after the first period. It suffices that the second period start after the first period has elapsed.

The operation of the booster circuit shown in FIG. 2 is described below with reference to FIGS. 4A and 4B taking the case where N is five (when multiplying voltage five times) as an example.

Figure 4A:
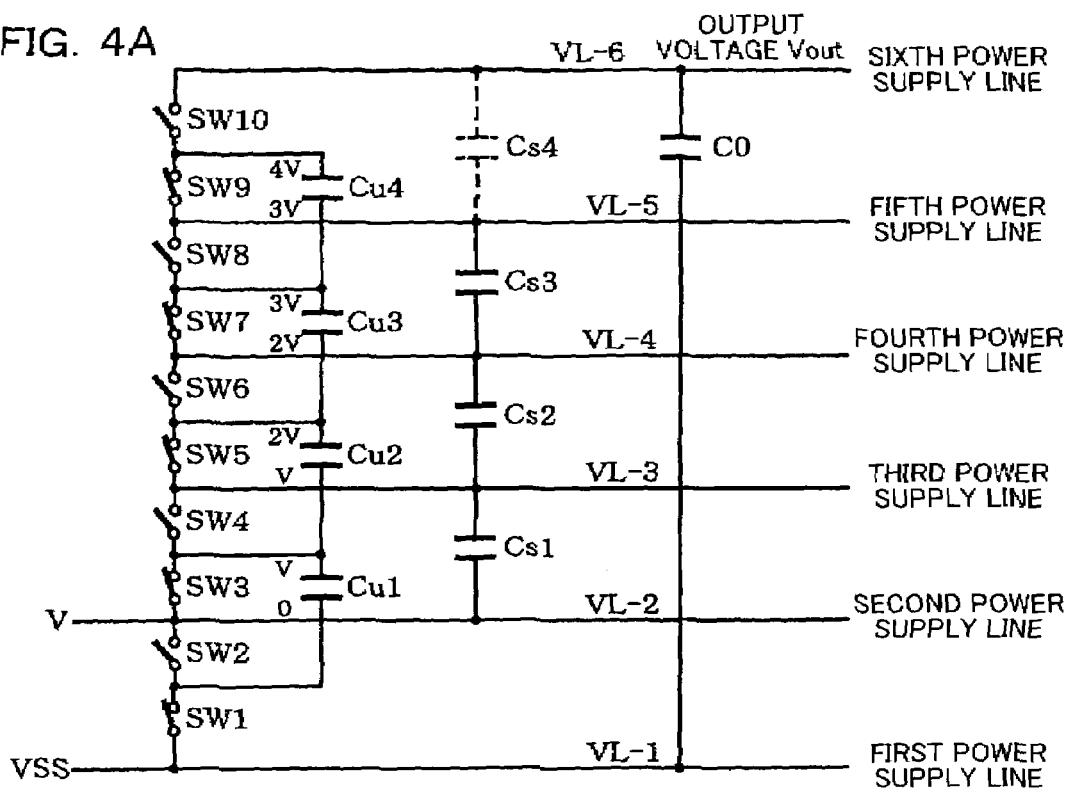
FIG. 4A is a schematic diagram of a switching state of the booster circuit shown in FIG. 2 in a first period.

FIG. 4A schematically shows a switching state of the booster circuit shown in FIG. 2 in the first period. FIG. 4B schematically shows a switching state of the booster circuit shown in FIG. 2 in the second period.

In the first period, the first, third, fifth, seventh, and ninth switching elements SW1, SW3, SW5, SW7, and SW9 are turned on, and the second, fourth, sixth, eighth, and tenth switching elements SW2, SW4, SW6, SW8, and SW10 are turned off (FIG. 4A). The voltage V (V, 0) between the first and second power supply lines VL-1 and VL-2 is applied to the first boost capacitor Cu1 in the first period. Therefore, an electric charge is stored in the first boost capacitor Cu1 in the first period so that the voltage applied to the first boost capacitor Cu1 becomes V.

Figure 4B:
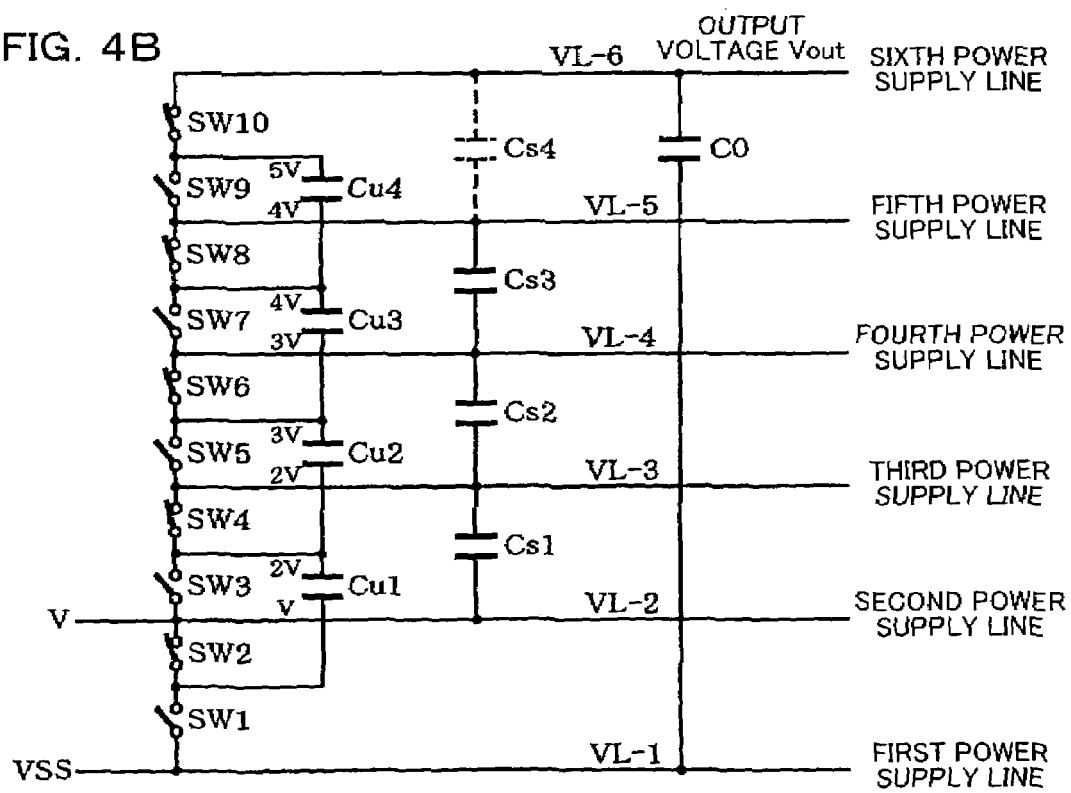
FIG. 4B is a schematic diagram of a switching state of the booster circuit shown in FIG. 2 in a second period.

In the second period, the first, third, fifth, seventh, and ninth switching elements SW1, SW3, SW5, SW7, and SW9 are turned off, and the second, fourth, sixth, eighth, and tenth switching elements SW2, SW4, SW6, SW8, and SW10 are turned on (FIG. 4B). This causes the second power supply line VL-2 to be connected with one end of the first boost capacitor Cu1 instead of the first power supply line VL-1. Therefore, the other end of the first boost capacitor Cu1 is at a voltage 2×V. Since the other end of the first boost capacitor Cu1 is connected with the third power supply line VL-3, the voltage V is also applied to the first stabilization capacitor Cs1 connected between the second and third power supply lines VL-2 and VL-3, and an electric charge is stored in the first stabilization capacitor Cs1 so that the voltage applied to the first stabilization capacitor Cs1 becomes V. This allows the voltage of the other end of the first stabilization capacitor Cs1 to be 2×V.

The above description also applies to the second boost capacitor Cu2. Specifically, the second power supply line VL-2 is connected with one end of the second boost capacitor Cu2 in the first period. The voltage V is supplied to the second power supply line VL-2. However, the other end of the first boost capacitor Cu1 is connected with the second power supply line VL-2. The other end of the first stabilization capacitor Cs1 is connected with the other end of the second boost capacitor Cu2. Therefore, the voltage V (2V, V) is applied to the second boost capacitor Cu2. Therefore, an electric charge is stored in the second boost capacitor Cu2 in the first period so that the voltage applied to the second boost capacitor Cu2 becomes V.

The voltage of the other end of the first boost capacitor Cu1 becomes 2×V in the second period. Therefore, the voltage of the other end of the second boost capacitor Cu2 of which one end is connected with the first boost capacitor Cu1 becomes 3×V. Since the other end of the second boost capacitor Cu2 is connected with the fourth power supply line VL-4, the voltage V is applied to the second stabilization capacitor Cs2 connected between the third and fourth power supply lines VL-3 and VL-4, and an electric charge is stored in the second stabilization capacitor Cs2 so that the voltage applied to the second stabilization capacitor Cs2 becomes V.

The voltage of the other end of the third and fourth boost capacitors Cu3 and Cu4 becomes a voltage boosted by using the charge-pump method in the same manner as described above. As a result, the voltage of the sixth power supply line VL-6 becomes 5×V, and is output as the output voltage Vout.

In FIGS. 2, 4A, and 4B, the booster circuit preferably further includes an (N−1)th stabilization capacitor Cs(N−1) connected between the N-th power supply line VL-N and the (N+1)th power supply line VL-(N+1), and the (N−1)th stabilization capacitor Cs(N−1) preferably stores an electric charge discharged from the (N−1)th boost capacitor Cu(N−1) in the second period. Specifically, it is preferable that the fourth stabilization capacitor Cs4 be further connected between the fifth and sixth power supply lines VL-5 and VL-6 when N is five. In FIGS. 2, 4A, and 4B, the fourth stabilization capacitor Cs4 corresponding to the (N−1)th stabilization capacitor Cs(N−1) is indicated by broken lines. In this case, the output voltage Vout boosted in the second period can be supplied in a stable state by the fourth stabilization capacitor Cs4.

In FIGS. 2, 4A, and 4B, the booster circuit preferably further includes a capacitor connected between the first power supply line VL-1 and the (N+1)th power supply line VL-(N+1). Specifically, it is preferable that a capacitor be connected between the first and sixth power supply lines VL-1 and VL-6 when N is five. In FIGS. 2, 4A, and 4B, the capacitor C0 is connected between the first and sixth power supply lines VL-1 and VL-6 corresponding to the first and (N+1)th power supply lines VL-1 and VL-(N+1). In this case, a decrease in the voltage level due to the load connected with the sixth power supply line VL-6 can be prevented.

A voltage equal to the voltage V between the first and second power supply lines VL-1 and VL-2 is applied to each boost capacitor and each stabilization capacitor by forming the booster circuit as described above. Each switching element may be resistant to a signal having an amplitude of the voltage V or 2×V instead of the boosted voltage N×V, as described later. Therefore, in the case of providing each boost capacitor and each stabilization capacitor in the IC, the switching element and the capacitor can be formed by using a low-voltage manufacturing process which realizes a reduction of cost without using a high-voltage manufacturing process resistant to a voltage of N×V.

2. Semiconductor Device

Figure 5:
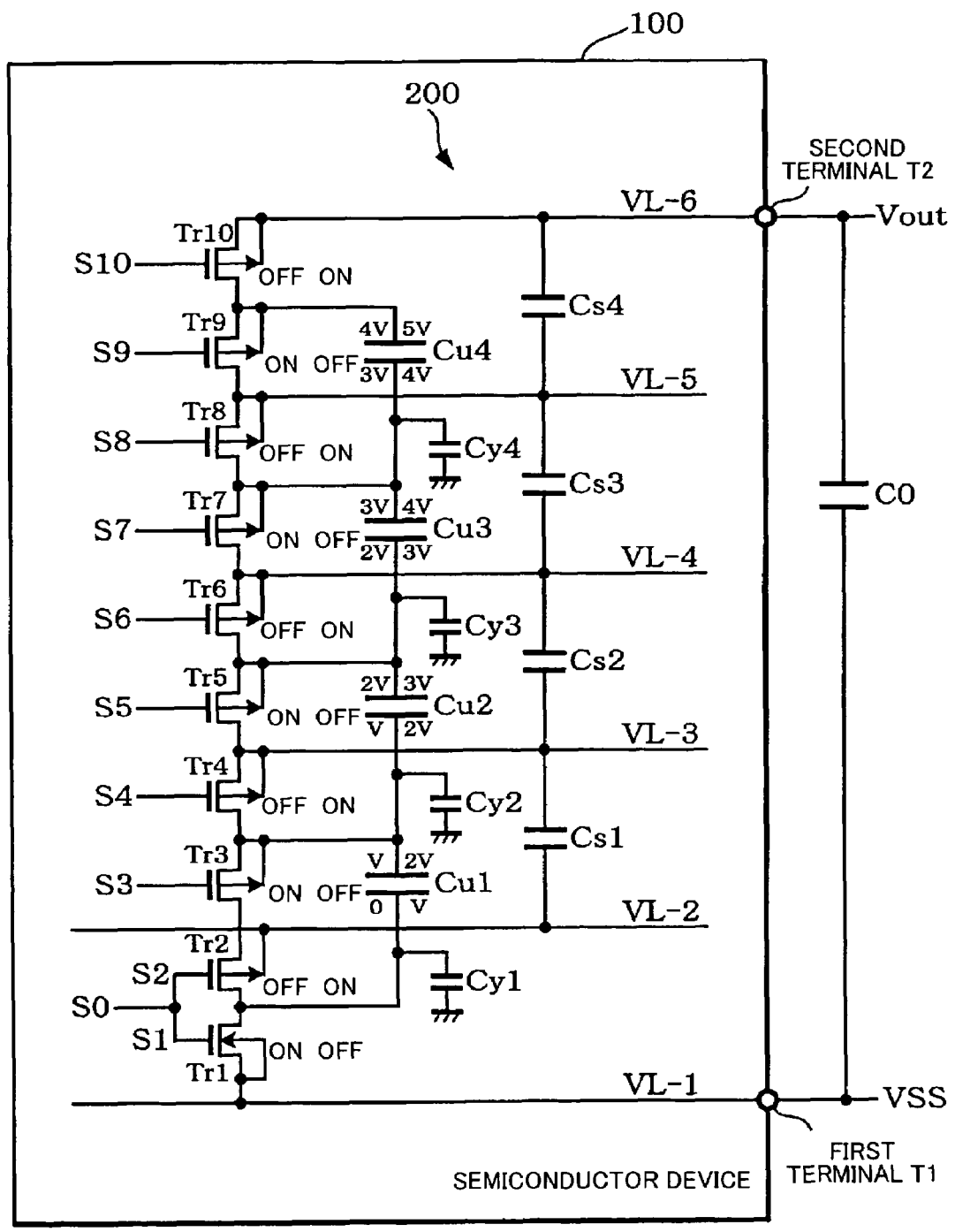
FIG. 5 is a diagram schematically showing a configuration of a semiconductor device in an embodiment of the present invention.

FIG. 5 shows an outline of a configuration of a semiconductor device in the present embodiment. In FIG. 5, sections the same as the constituent elements shown in FIG. 2 are denoted by the same symbols. Description of these sections is appropriately omitted.

A semiconductor device 100 (integrated circuit device (IC) or chip) includes a booster circuit 200 shown in FIG. 2. Specifically, the semiconductor device 100 includes first to 2N-th switching elements (N is an integer greater than two), one end of the first switching element being connected with the first power supply line, one end of the 2N-th switching element being connected with the (N+1)th power supply line, and the remaining switching elements excluding the first and 2N-th switching elements being connected in series between the other end of the first switching element and the other end of the 2N-th switching element, first to (N−1)th boost capacitors, one end of each of the boost capacitors being connected with a j-th connection node ($1 \leq j \leq 2N-3$, j is an odd number) to which the j-th and (j+1)th switching elements are connected, and the other end of the boost capacitor being connected with a (j+2)th connection node to which the (j+2)th and (j+3)th switching elements are connected, and first to (N−2)th stabilization capacitors, one end of each of the stabilization capacitors being connected with a k-th connection node ($2 \leq k \leq 2N-4$, k is an even number) to which the k-th and (k+1)th switching elements are connected, and the other end of the stabilization capacitor being connected with a (k+2)th connection node to which the (k+2)th and (k+3)th switching elements are connected. In the semiconductor device 100, the switching elements are switch-controlled so that one of the m-th switching element ($1 \leq m \leq 2N-1$, m is an integer) and the (m+1)th switching element is turned on.

The booster circuit 200 may further include an (N−1)th stabilization capacitor connected between the N-th power supply line and the (N+1)th power supply line, and the (N−1)th stabilization capacitor may store an electric charge discharged from the (N−1)th boost capacitor in the second period.

FIG. 5 shows the configuration of the booster circuit 200 when N is five (when multiplying voltage five times). The fourth stabilization capacitor Cs4 corresponding to the (N−1)th stabilization capacitor Cs(N−1) is connected between the fifth and sixth power supply lines VL-5 and VL-6.

The semiconductor device 100 includes the boost capacitors and the stabilization capacitors of the booster circuit 200. In FIG. 5, the first to fourth boost capacitors Cu1 to Cu4 and the first to fourth stabilization capacitors Cs1 to Cs4 of the booster circuit 200 are provided in the semiconductor device 100.

Only a capacitor for stabilizing the boosted voltage is provided outside the semiconductor device 100. In more detail, the semiconductor device 100 includes first and second terminals T1 and T2 which are electrically connected with the first and (N+1)th power supply lines VL-1 and VL-(N+1), respectively, and the capacitor C0 is connected between the first and second terminals T1 and T2 outside the semiconductor device 100. In FIG. 5, the semiconductor device 100 includes the first and second terminals T1 and T2 electrically connected with the first and sixth power supply lines VL-1 and VL-6, respectively, and the capacitor C0 is connected between the first and second terminals T1 and T2 outside the semiconductor device 100.

The switching element of the booster circuit 200 is formed by a metal-oxide semiconductor (MOS) transistor. In more detail, the first switching element SW1 is formed by an n-channel MOS transistor Tr1. The second to tenth switching elements SW2 to SW10 are formed by p-channel MOS transistors Tr2 to Tr10.

Figure 6:
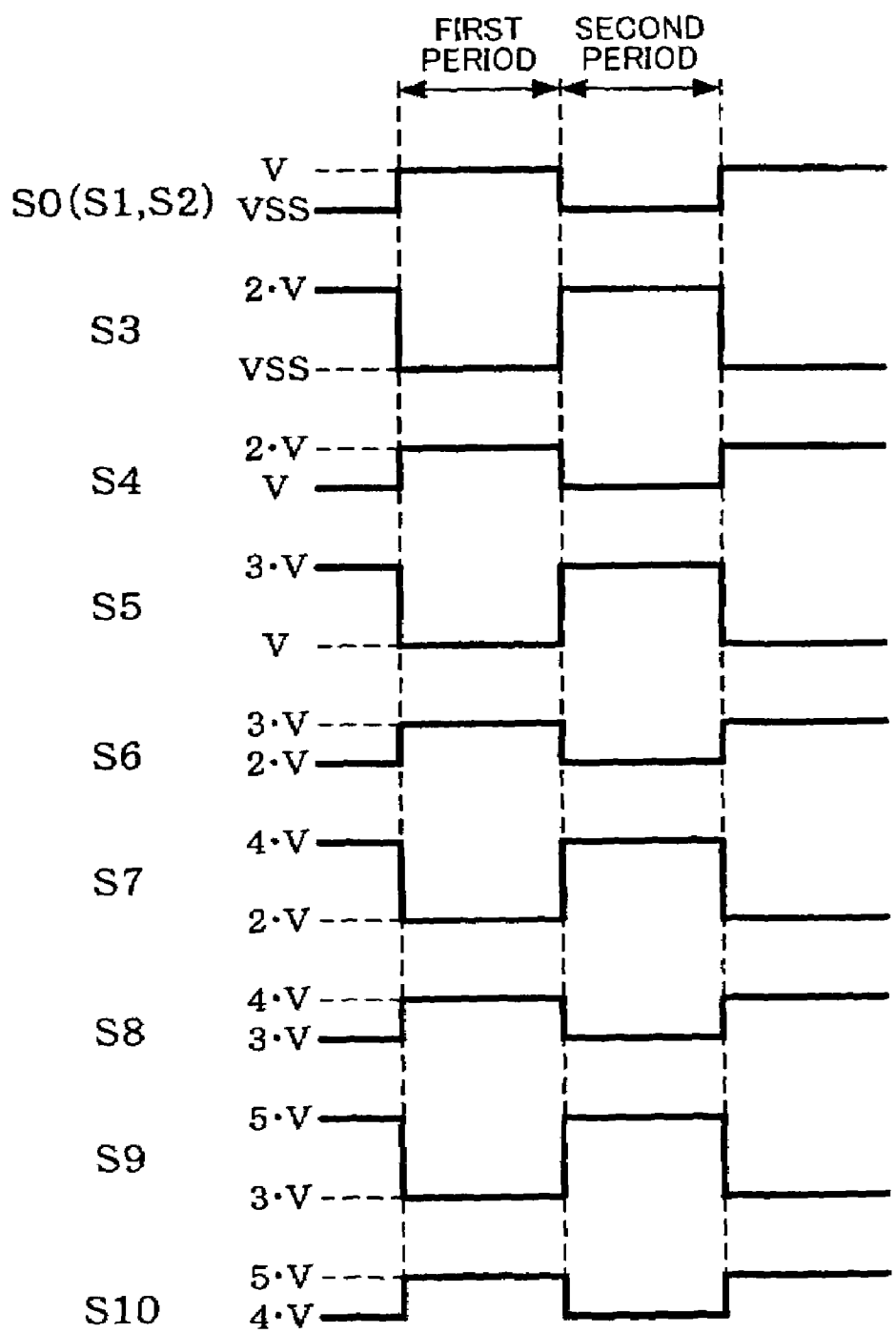
FIG. 6 is a timing diagram schematically showing an operation of a switch control signal shown in FIG. 5.

Therefore, the switch control signals S1 to S10 which on/off control the MOS transistors as the switching elements are generated at a timing shown in FIG. 6. A switch control signal S0 is used as the switch control signals S1 and S2 for the MOS transistors Tr1 and Tr2.

In FIG. 5, the conducting state of each MOS transistor in the first and second periods is indicated by "ON" or "OFF". The conducting state in the first period is shown on the left, and the conducting state in the second period is shown on the right.

FIG. 5 also shows the voltages applied to each boost capacitor in the first and second periods. The voltage applied in the first period is shown on the left, and the voltage applied in the second period is shown on the right.

The operation of the booster circuit 200 is the same as described with reference to FIGS. 2, 3, 4A, and 4B. Therefore, description of the operation is omitted.

2.1 Output Impedance

The output impedance of the booster circuit 200 is calculated below in order to describe the effects of the booster circuit 200.

The output impedance Z of the booster circuit 200 corresponds to a slope along which the voltage of the sixth power supply line VL-6 drops when a current I is flowed from the sixth power supply line VL-6 to which the boosted output voltage Vout is supplied, as shown by the following equation (1).

$$Vout = I \cdot Z \quad (1)$$

The capability of the booster circuit is expressed by using the output impedance of the booster circuit. The smaller the value of the output impedance, the smaller the voltage drop when the current is drawn by the load. Therefore, the smaller the value of the output impedance, the higher the capability (charge supply capability and load drive capability) of the booster circuit, and the greater the value of the output impedance, the lower the capability of the booster circuit. The capability of the booster circuit is preferably higher.

The output impedance of the booster circuit 200 is simply calculated as described below.

Figure 7A:
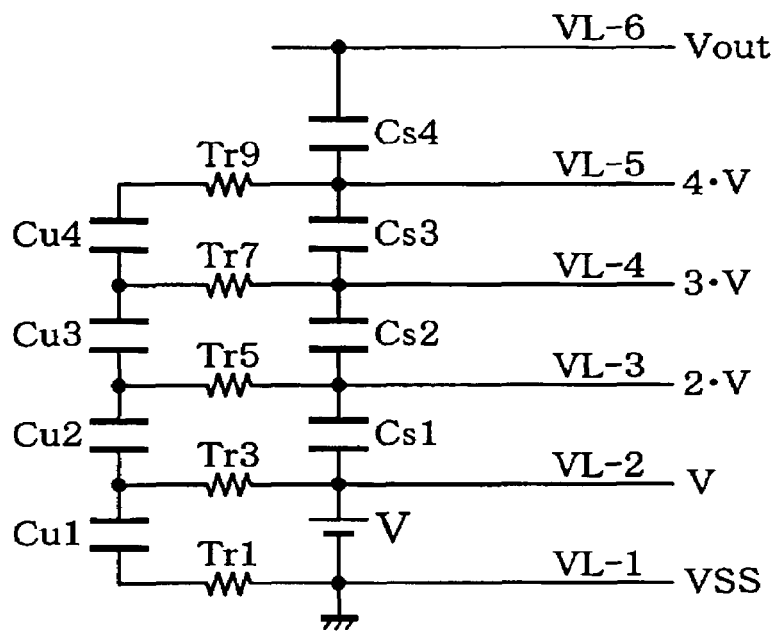
FIGS. 7A and 7B are equivalent circuit diagrams of a booster circuit.
Figure 7B:
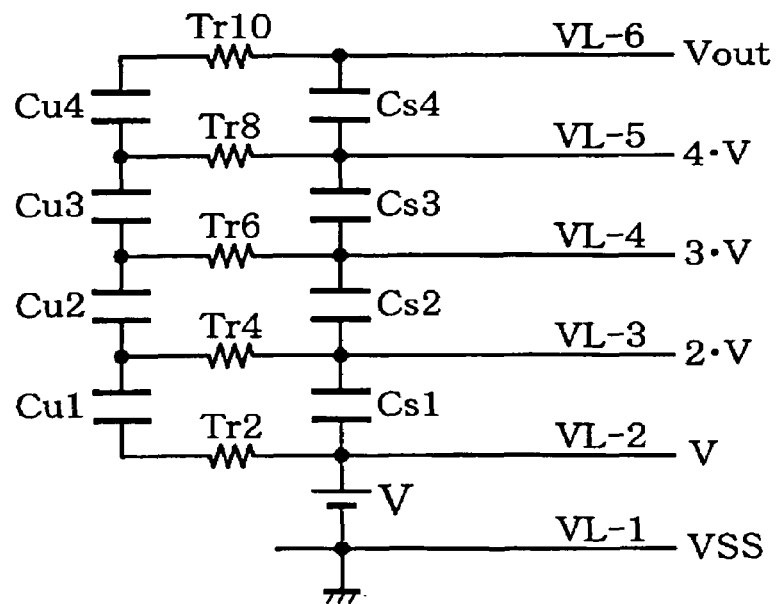

FIGS. 7A and 7B show equivalent circuits of the booster circuit 200. FIG. 7A shows an equivalent circuit of the booster circuit 200 in the first period. FIG. 7B shows an equivalent circuit of the booster circuit 200 in the second period. A resistance element in each equivalent circuit shows the ON resistance of the MOS transistor. A power supply in each equivalent circuit shows that the voltage V is applied between the first and second power supply lines VL-1 and VL-2.

Eight states of the charge-pump operation of the booster circuit 200 are considered below by using each equivalent circuit. The impedance in each state is then calculated.

FIGS. 8A, 8B, 8C, and 8D show equivalent circuits of the first-half four states of the charge-pump operation of the booster circuit 200.

FIGS. 9A, 9B, 9C, and 9D show equivalent circuits of the latter-half four states of the charge-pump operation of the booster circuit 200.

Figure 8A:
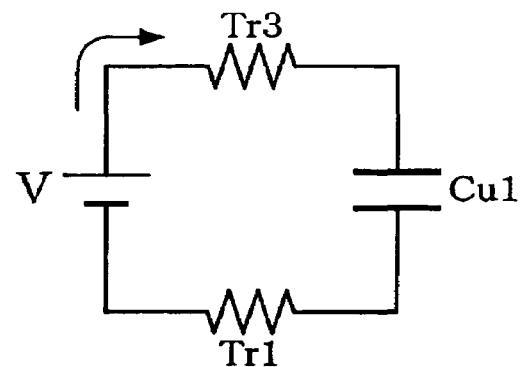
FIGS. 8A, 8B, 8C, and 8D are equivalent circuit diagrams of first-half four states of a charge-pump operation of a booster circuit.
Figure 8B:
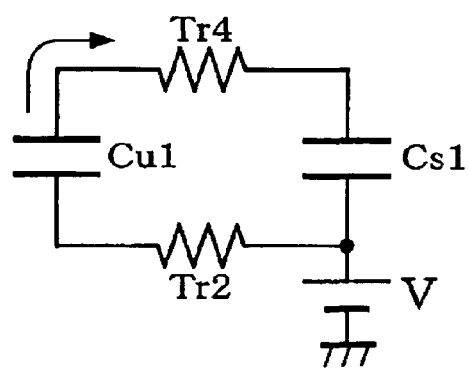
Figure 8C:
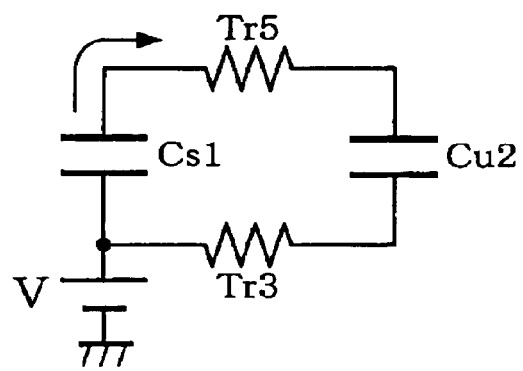
Figure 8D:
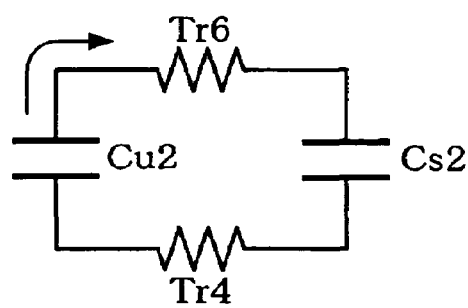

FIG. 8A is an equivalent circuit in which the MOS transistors Tr1 and Tr3 are turned on. FIG. 8B is an equivalent circuit in which the MOS transistors Tr2 and Tr4 are turned on. FIG. 8C is an equivalent circuit in which the MOS transistors Tr3 and Tr5 are turned on. FIG. 8D is an equivalent circuit in which the MOS transistors Tr4 and Tr6 are turned on.

Figure 9A:
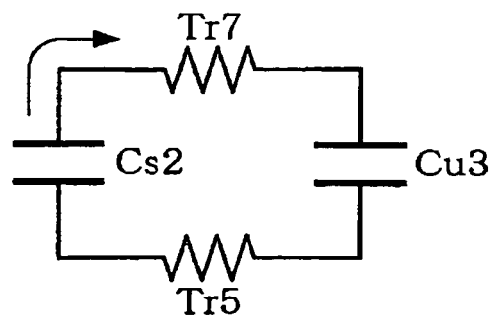
FIGS. 9A, 9B, 9C, and 9D are equivalent circuit diagrams of latter-half four states of a charge-pump operation of a booster circuit.
Figure 9B:
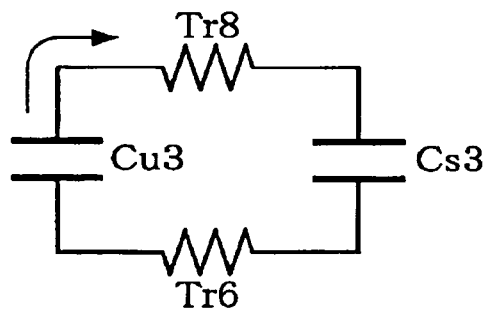
Figure 9C:
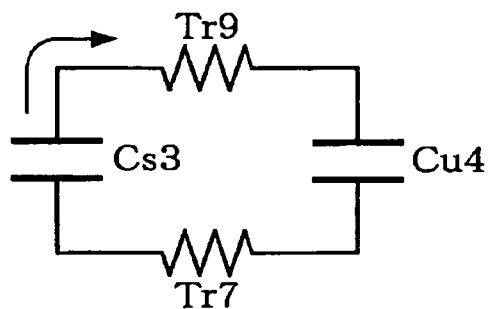
Figure 9D:
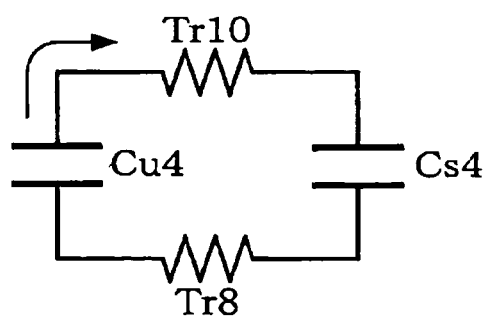

FIG. 9A is an equivalent circuit in which the MOS transistors Tr5 and Tr7 are turned on. FIG. 9B is an equivalent circuit in which the MOS transistors Tr6 and Tr8 are turned on. FIG. 9C is an equivalent circuit in which the MOS transistors Tr7 and Tr9 are turned on. FIG. 9D is an equivalent circuit in which the MOS transistors Tr8 and Tr10 are turned on.

The value of the ON resistance of each MOS transistor is denoted by r. The impedance is divided into a DC component and an AC component in each state shown in FIGS. 8A, 8B, 8C, 8D, 9A, 9B, 9C, and 9D.

The DC component of the impedance in each state is made up of the ON resistance of two MOS transistors. Therefore, the DC component is 2r.

The current i which flows in each state is calculated as shown by "$i = cfV$". The term "f" stands for the switching frequency. Since the AC component of the impedance occurs by switching between each state, the AC component is expressed by $1/(c \cdot f)$. Specifically, the AC component of the impedance becomes $1/(Cu1 \cdot f)$ by switching from the state shown in FIG. 8A to the state shown in FIG. 8B.

The AC component of the impedance becomes $1/(Cs1 \cdot f)$ by switching from the state shown in FIG. 8B to the state shown in FIG. 8C. The AC component of the impedance becomes $1/(Cu2 \cdot f)$ by switching from the state shown in FIG. 8C to the state shown in FIG. 8D. The AC component of the impedance becomes $1/(Cs2 \cdot f)$ by switching from the state shown in FIG. 8D to the state shown in FIG. 9A. The AC component of the impedance becomes $1/(Cu3 \cdot f)$ by switching from the state shown in FIG. 9A to the state shown in FIG. 9B. The AC component of the impedance becomes $1/(Cs3 \cdot f)$ by switching from the state shown in FIG. 9B to the state shown in FIG. 9C. The AC component of the impedance becomes $1/(Cu4 \cdot f)$ by switching from the state shown in FIG. 9C to the state shown in FIG. 9D.

The capacitance of each boost capacitor and each stabilization capacitor is denoted by c. Since the output impedance Z is the sum of the DC component and the AC component of the impedance, the output impedance Z is expressed by the following equation (2).

$$Z = 8 \times 2r + 7 \times 1/(c \cdot f) = 16r + 7/(c \cdot f) \quad (2)$$

In the case of multiplying voltage N times, the general equation of the output impedance is expressed by the following equation (3).

$$Z = \{(2N-4) \times 2 + 4\} \times r + (2N-3)/(c \cdot f) = (4N-4)r + (2N-3)/(c \cdot f) \quad (3)$$

2.2 Comparative Example

A booster circuit in a comparative example is described below for comparison with the booster circuit 200 shown in FIG. 5.

Figure 10:
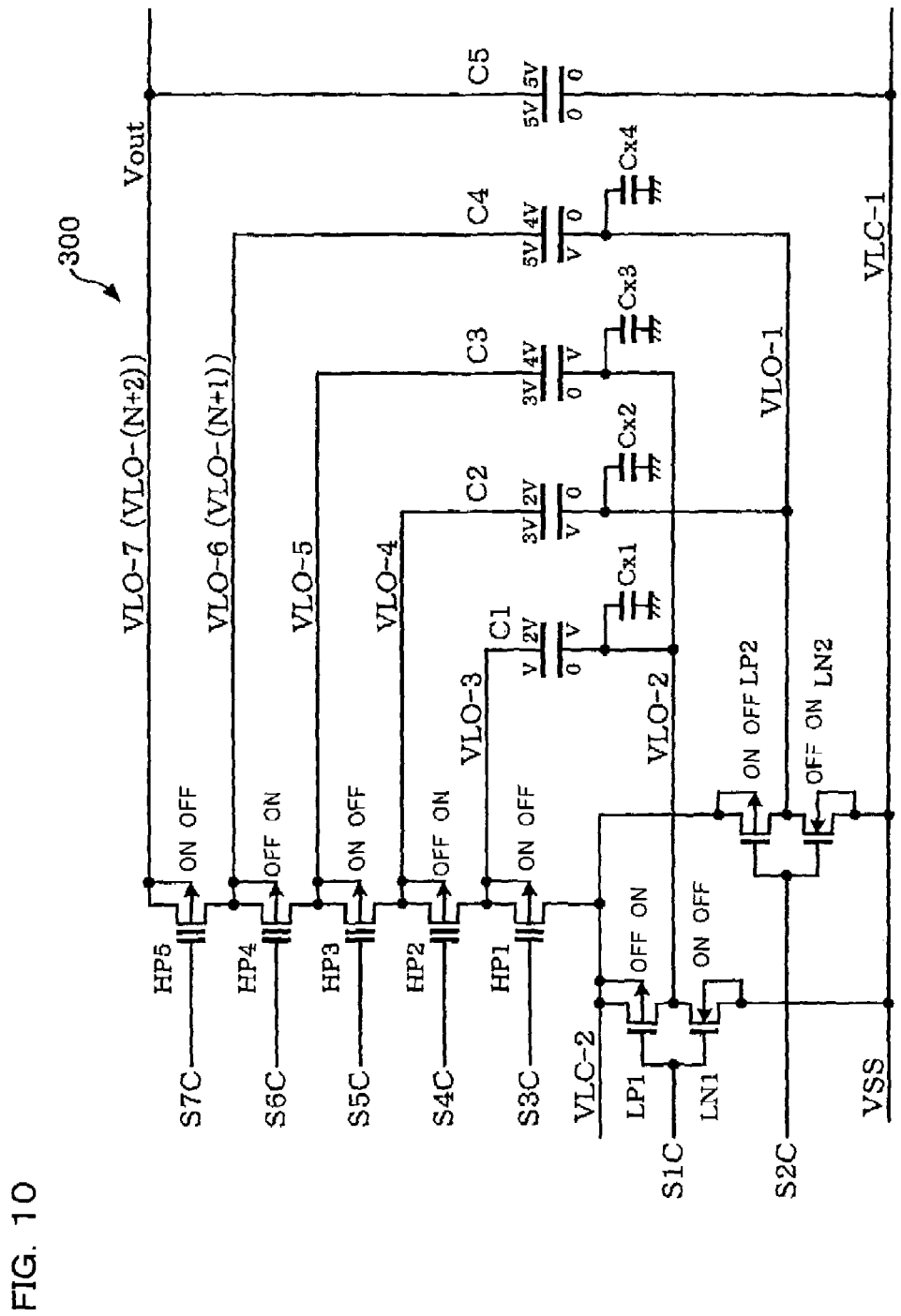
FIG. 10 is a diagram of a configuration example of a booster circuit in a comparative example.

FIG. 10 shows a configuration example of a booster circuit in the comparative example. In FIG. 10, sections the same as the sections of the booster circuit 200 shown in FIG. 5 are denoted by the same symbols.

A booster circuit 300 in the comparative example includes first and second power supply lines VLC-1 and VLC-2, and first to (N+2)th output power supply lines VLO-1 to VLO-(N+2). The booster circuit 300 outputs the boosted voltage N×V obtained by multiplying the voltage V between the first and second power supply lines VLC-1 and VLC-2 N times to the (N+2)th output power supply line VLO-(N+2) as the output voltage Vout.

The booster circuit 300 includes n-channel MOS transistors LN1 and LN2 and p-channel MOS transistors LP1 and LP2 as first to fourth low-voltage switching elements. The booster circuit 300 includes p-channel MOS transistors HP1 to HPN as first to N-th high-voltage resistant switching elements.

The MOS transistors LP1 and LN1 are connected in series between the first and second power supply lines VLC-1 and VLC-2. The MOS transistors LP1 and LN1 are on/off controlled by a switch control signal S1C. The MOS transistors LP2 and LN2 are connected in series between the first and second power supply lines VLC-1 and VLC-2. The MOS transistors LP2 and LN2 are on/off controlled by the switch control signal S2C.

The MOS transistors HP1 to HPN are connected in series between the second power supply line VLC-2 and the (N+2)th output power supply line VLO-(N+2). A drain terminal of the MOS transistor HP1 is connected with the second power supply line VLC-2. A source terminal of the MOS transistor HPN is connected with the (N+2)th output power supply line VLO-(N+2). The MOS transistors HP1 to HPN are on/off controlled by switch control signals S3C to S(N+2)C.

The first output power supply line VLO-1 is connected with a drain terminal of the MOS transistor LN2 and a drain terminal of the MOS transistor LP2. The second output power supply line VLO-2 is connected with a drain terminal of the MOS transistor LN1 and a drain terminal of the MOS transistor LP1.

In the case where N is an odd number, a flying capacitor is connected between the second output power supply line VLO-2 and the MOS transistor HPq ($1 \leq q \leq N$, q is an even number). Therefore, (N−1)/2 flying capacitors are connected with the second output power supply line VLO-2. A flying capacitor is connected between the first output power supply line VLO-1 and the MOS transistor HPt ($2 \leq t \leq N$, t is an odd number). Therefore, (N−1)/2 flying capacitors are connected with the first output power supply line VLO-1.

In the case where N is an even number, a flying capacitor is connected between the second output power supply line VLO-2 and the MOS transistor HPq ($1 \leq q \leq N$, q is an even number). Therefore, N/2 flying capacitors are connected with the second output power supply line VLO-2. A flying capacitor is connected between the first output power supply line VLO-1 and the MOS transistor HPt ($2 \leq t \leq N$, t is an odd number). Therefore, (N/2−1) flying capacitors are connected with the first output power supply line VLO-1.

FIG. 10 shows the configuration example when N is five (when multiplying voltage five times). In FIG. 10, a capacitor C5 is connected between the seventh output power supply line VLO-7 to which the output voltage Vout is output and the first power supply line VLC-1 in order to stabilize the output voltage Vout.

In FIG. 10, the conducting state of each MOS transistor in the first and second periods is indicated by "ON" or "OFF" in the same manner as in FIG. 5. The conducting state in the first period is shown on the left, and the conducting state in the second period is shown on the right.

FIG. 10 also shows the voltages applied to each flying capacitor in the first and second periods. The voltage applied in the first period is shown on the left, and the voltage applied in the second period is shown on the right.

Figure 11:
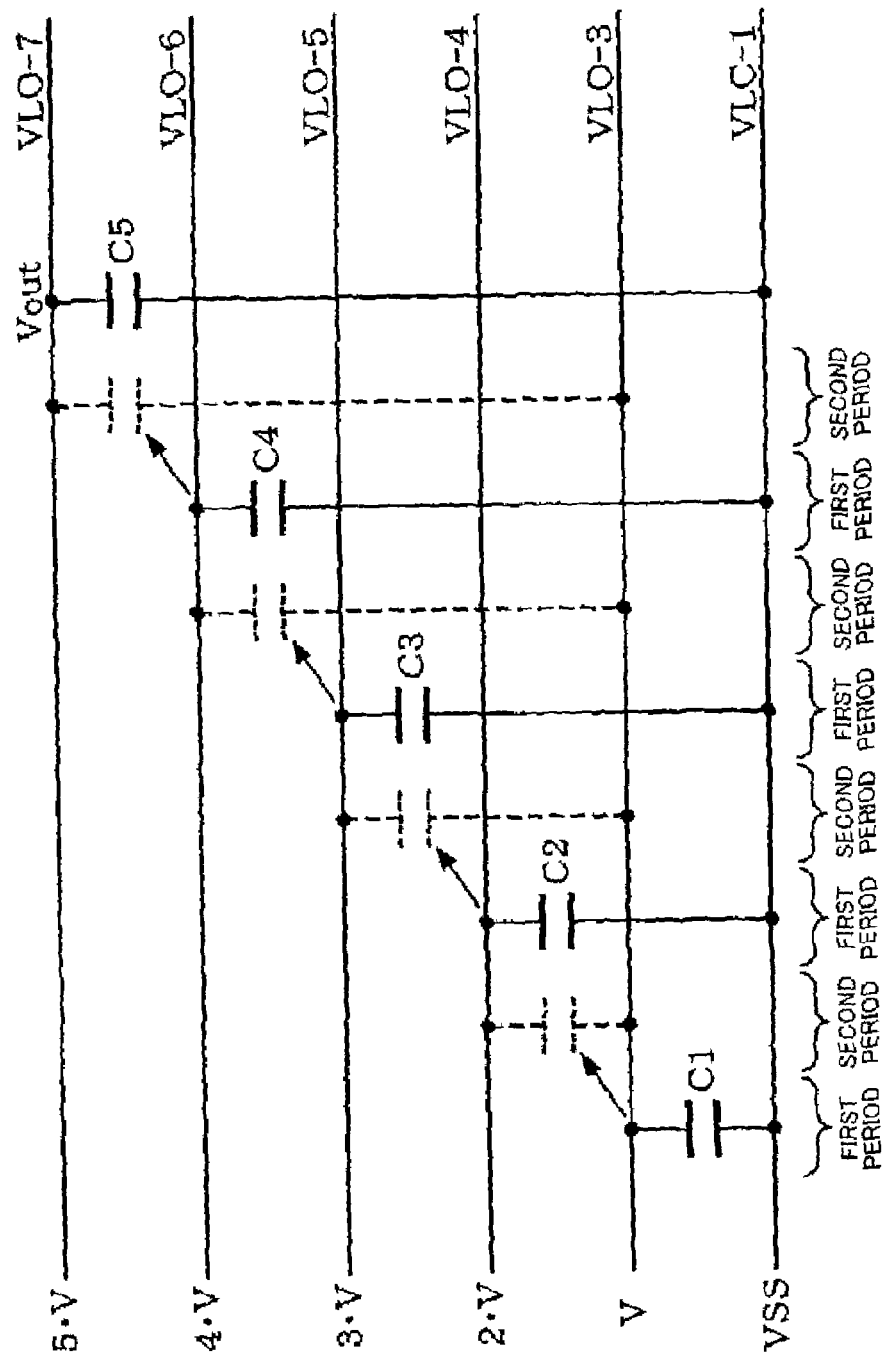
FIG. 11 is illustrative of an operation principle of a booster circuit in a comparative example.

FIG. 11 shows an explanatory diagram of the operation principle of the booster circuit in the comparative example. As shown in FIG. 11, the boosted voltage obtained by multiplying the voltage between the first and second power supply lines VLC-1 and VLC-2 N times is output to the (N+2)th output power supply line VLO-(N+2) (seventh output power supply line VLO-7 in FIG. 11) as the output voltage Vout by using the charge-pump method in which the first and second periods are repeated.

The output impedance of the booster circuit 300 in the comparative example is simply calculated as described below.

Figure 12A:
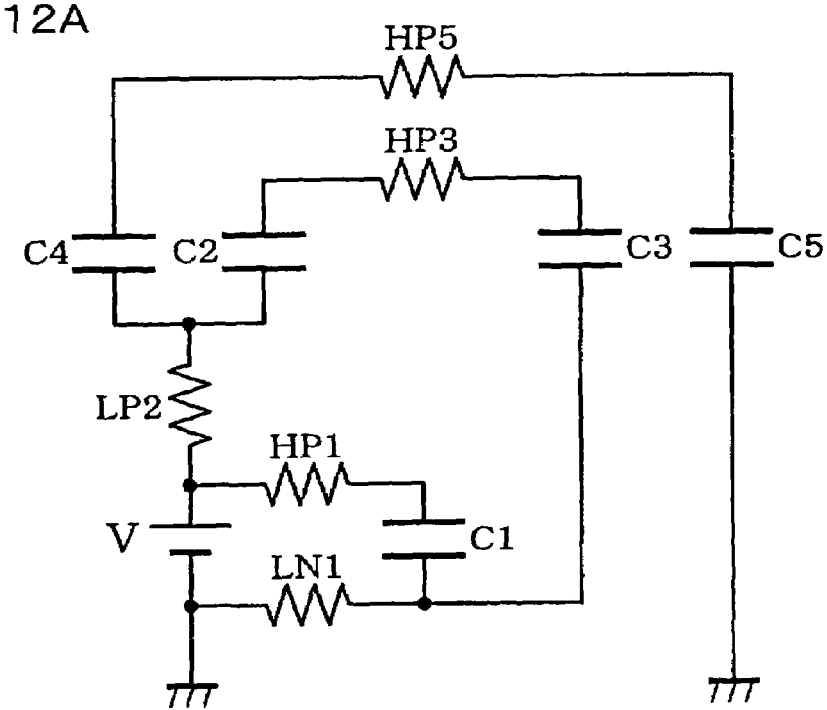
FIGS. 12A and 12B are equivalent circuit diagrams of a booster circuit in a comparative example.
Figure 12B:
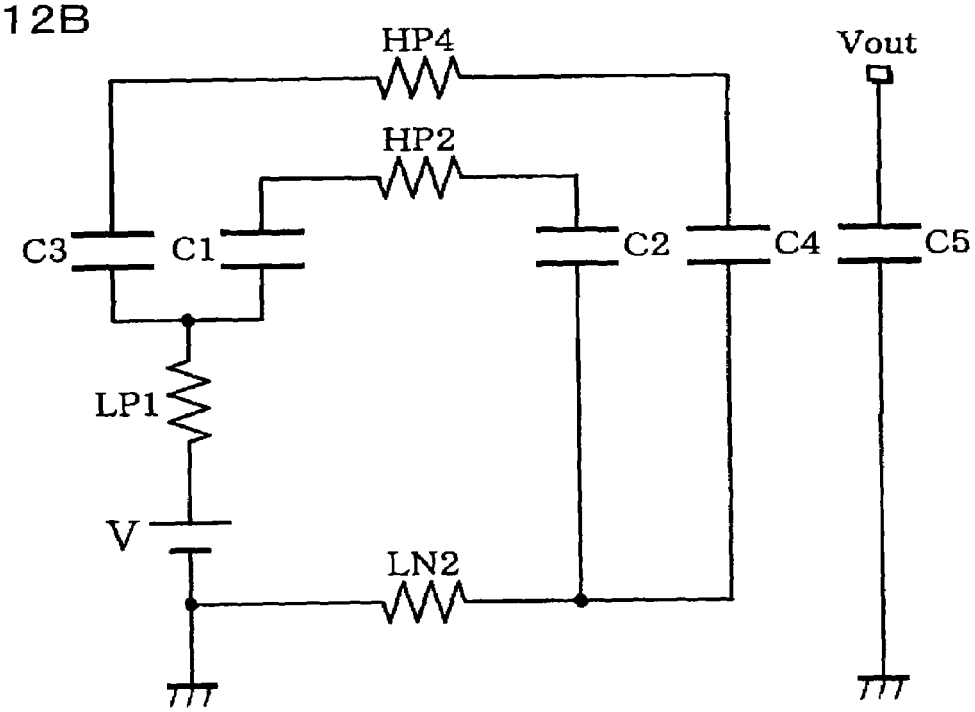

FIGS. 12A and 12B show equivalent circuits of the booster circuit 300 in the comparative example. FIG. 12A shows an equivalent circuit of the booster circuit 300 in the first period. FIG. 12B shows an equivalent circuit of the booster circuit 300 in the second period. A resistance element in each equivalent circuit shows the ON resistance of the MOS transistor. A power supply in each equivalent circuit shows that the voltage V is applied between the first and second power supply lines VLC-1 and VLC-2.

Five states of the charge-pump operation of the booster circuit 300 are considered below by using each equivalent circuit. The impedance in each state is then calculated.

FIGS. 13A, 13B, 13C, 13D, and 13E show equivalent circuits of the five states of the charge-pump operation of the booster circuit 300.

Figure 13A:
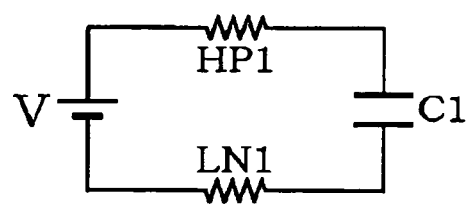
FIGS. 13A, 13B, 13C, 13D, and 13E are equivalent circuit diagrams of five states of a charge-pump operation of a booster circuit.
Figure 13B:
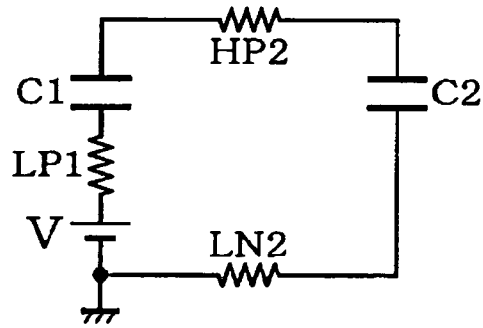
Figure 13C:
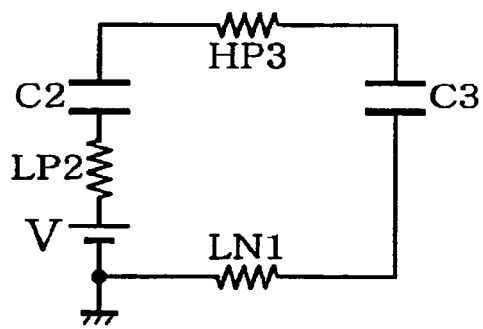
Figure 13D:
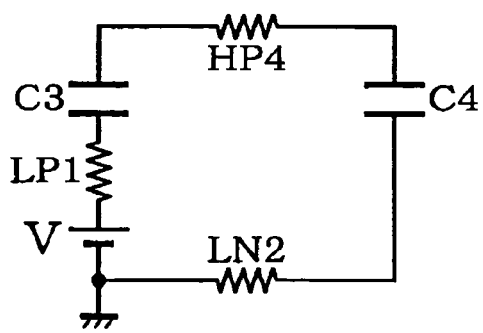
Figure 13E:
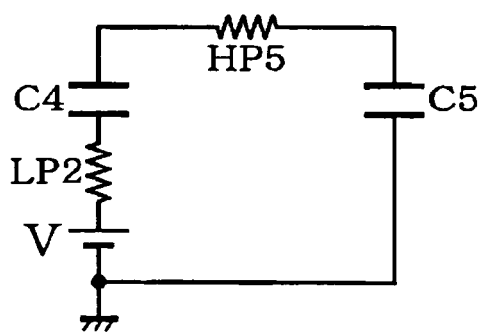

FIG. 13A is an equivalent circuit in which the MOS transistors HP1 and LN1 are turned on. FIG. 13B is an equivalent circuit in which the MOS transistors HP2 and LN2 are turned on. FIG. 13C is an equivalent circuit in which the MOS transistors HP3 and LN1 are turned on. FIG. 13D is an equivalent circuit in which the MOS transistors HP4 and LN2 are turned on. FIG. 13E is an equivalent circuit in which the MOS transistors HP5 and LP2 are turned on.

The value of the ON resistance of each MOS transistor is denoted by r. The impedance is divided into a DC component and an AC component in each state shown in FIGS. 13A, 13B, 13C, 13D, and 13E.

The DC component of the impedance in each state shown in FIGS. 13A and 13E is 2r. The DC component of the impedance in each state shown in FIGS. 13B, 13C, and 13D is 3r.

The AC component of the impedance is calculated in the same manner as described above. Specifically, the AC component of the impedance becomes $1/(C1 \cdot f)$ by switching from the state shown in FIG. 13A to the state shown in FIG. 13B. The AC component of the impedance becomes $1/(C2 \cdot f)$ by switching from the state shown in FIG. 13B to the state shown in FIG. 13C The AC component of the impedance becomes $1/(C3 \cdot f)$ by switching from the state shown in FIG. 13C to the state shown in FIG. 13D The AC component of the impedance becomes $1/(C4 \cdot f)$ by switching from the state shown in FIG. 13D to the state shown in FIG. 13E.

The capacitance of each flying capacitor is denoted by c. Since the output impedance Zc is the sum of the DC component and the AC component of the impedance, the output impedance Zc is expressed by the following equation (4). The AC component of the capacitor C5 also occurs by the load connected with the seventh output power supply line VLO-7. However, the capacitor C5 is provided as an external capacitor, and has a capacitance sufficiently greater than the capacitances of the flying capacitors C1 to C4. Therefore, the flying capacitors C1 to C4 become dominant as the impedance, and the AC component of the capacitor C5 can be ignored.

$$Zc=(2\times2r+3\times3r)+4\times1/(c\cdot f)=13r+4/(c\cdot f) \qquad (4)$$

In the case of multiplying voltage N times, the general equation of the output impedance is expressed by the following equation (5).

$$Zc=\{2\times2r+(N\times2)\times3r\}+(N-1)/(c\cdot f)=(3N-2)r+(N-1)/(c\cdot f) \qquad (5)$$

2.3 Comparison With Comparative Example

The configuration of the booster circuit 200 in the present embodiment shown in FIG. 5 is compared with the configuration of the booster circuit 300 in the comparative example shown in FIG. 10. Although both of the circuits boost voltage by multiplying the voltage by five times, the number of capacitors and the number of switching elements are greater in the charge-pump circuit 200.

The output impedance Z of the booster circuit 200 in the present embodiment shown in FIG. 5 is compared with the output impedance Zc of the booster circuit 300 in the comparative example shown in FIG. 10. As is clear from the equations (2) and (4), the output impedance Zc is smaller than the output impedance Z.

Therefore, it is generally advantageous to employ the booster circuit 300 in the comparative example instead of the booster circuit 200 in the present embodiment.

However, in the case where the capacitors of the booster circuit are provided in the semiconductor device, all the boost capacitors and stabilization capacitors of the booster circuit 200 in the present embodiment can be manufactured by using a low-voltage manufacturing process. On the other hand, the MOS transistors HP1 to HP5 and the flying capacitors C2 to C4 of the booster circuits 300 in the comparative example must be manufactured by using a high-voltage resistant manufacturing process.

The low voltage used herein means a voltage defined by the voltage V (1.8 to 3.3 V, for example) between the first and second power supply lines VLC-1 and VLC-2 (VL-1 and VL-2) in the design rule. The high-voltage resistant used herein means a resistance to a high voltage of 10 to 20 V, for example, in the design rule.

The film thickness between the electrodes of the capacitor formed in the semiconductor device differs depending on whether the low-voltage manufacturing process or the high-voltage resistant manufacturing process is used. The film thickness between the electrodes of the capacitor formed by using the low-voltage manufacturing process can be further reduced, whereby the capacitance per unit area can be increased. Specifically, the area of the capacitor formed by using the low-voltage manufacturing process can be made smaller than the area of the capacitor formed by using the high-voltage resistant manufacturing process in order to obtain a certain capacitance. Moreover, the influence of an increase in the number of capacitors can be reduced assuming that the capacitors are provided in the semiconductor device.

Therefore, in the case of providing the capacitors in the same area of the semiconductor device, the booster circuit 200 in the present embodiment is more advantageous than the booster circuit 300 in the comparative example.

The following advantages are obtained by providing the capacitors of the booster circuit 200 in the present embodiment in the semiconductor device.

Since the MOS transistor as the switching element can be manufactured by using the low-voltage manufacturing process, the charge/discharge current due to the gate capacitance of the MOS transistor can be reduced. Since the channel width of the low-voltage MOS transistor can be reduced in comparison with a high-voltage resistant MOS transistor which realizes the same ON resistance, the charge/discharge voltage is low as shown in FIG. 5. On the contrary, the charge/discharge voltage in FIG. 10 is V to 5×V, and 5×V is a high voltage. Therefore, the charge/discharge current due to the gate capacitance can be reduced by employing the low-voltage MOS transistor, even if the gate capacitance is increased due to a decrease in the gate film thickness.

In comparison with the booster circuit 300 in the comparative example, when the capacitors are formed in the semiconductor device for the booster circuit 200 in the present embodiment with the same cost to obtain the same output impedance (same capability) as the booster circuit 300 in the comparative example, current consumption accompanying switching can be reduced by the booster circuit 200 in the present embodiment.

This advantage is described below. Since a sufficient time is necessary for charging the capacitor of the booster circuit, the time constant $C \cdot r$ is sufficiently smaller than $1/2f$ (charge/discharge frequency). The time constant $C \cdot r$ is assumed to be one-tenth of the pulse of the switch control signal, for example. The capacitances of the capacitors of the booster circuit 200 and the booster circuit 300 are assumed to be the same, and the values of the ON resistance of the MOS transistors are assumed to be the same.

$$C \cdot r = 1/(20 \cdot f) \tag{6}$$

Therefore, substituting the equation (6) in the equations (2) and (4) yields the following equations (7) and (8).

$$Z = 13/(20 \cdot Ca \cdot fa) + 4/(Ca \cdot fa) \tag{7}$$

$$Zc = 16/(20 \cdot Cb \cdot fb) + 7/(Cb \cdot fb) \tag{8}$$

In the equations (7) and (8), "Ca" stands for the capacitance of one capacitor in the booster circuit 300, and "Cb" stands for the capacitance of one capacitor in the booster circuit 200. The term "fa" stands for the charge/discharge frequency of each capacitor in the booster circuit 300, and "fb" stands for the charge/discharge frequency of each capacitor in the booster circuit 200.

In order to equalize the output impedance Z of the booster circuit 200 and the output impedance Zc of the booster circuit 300, Z=Zc from the equations (7) and (8). Therefore, the following equation (9) is obtained.

$$Cb \cdot fb = (7.8/4.65) \cdot Ca \cdot fa = 1.68 \cdot Ca \cdot fa \tag{9}$$

The film thickness of an insulating oxide film when manufacturing a capacitor CLV by using the low-voltage manufacturing process is 10 nm, and the film thickness of an insulating oxide film when manufacturing a capacitor CHV by using the high-voltage manufacturing process resistant to 16 V is 55 nm, for example. In this case, the capacitance ratio per unit area is expressed by the following equation (10).

$$CLV = 5.5 \cdot CHV \tag{10}$$

In the charge-pump circuit 300 shown in FIG. 10, only the flying capacitor C1 is for a low voltage, and the flying capacitors C2 to C4 need to be resistant to a high voltage. Therefore, in order to equalize the capacitances of all the capacitors, the area of the capacitors is as follows provided that the entire area is S.

Area of low-voltage capacitor: 0.057·S (11)

Area of high-voltage capacitor: 0.314·S (12)

In the booster circuit 200 shown in FIG. 5, since it suffices that all the eight boost capacitors and stabilization capacitors have a low voltage, the area of the capacitors is as follows provided that the entire area is S.

Area of low-voltage capacitor: 0.125·S (13)

Therefore, in order to realize the sum of the capacitance Ca of one capacitor of the booster circuit 300 and the capacitance Cb of one capacitor of the booster circuit 200 in the same area, the following relational equation is obtained.

$$Cb = (0.125/0.057) \cdot Ca = 2.19 \cdot Ca \tag{14}$$

The relationship between fb and fa is expressed by the following equation (15) by substituting the equation (14) in the equation (9).

$$fb = 0.77 \cdot fa \tag{15}$$

The equation (15) shows that the charge/discharge frequency fb of the booster circuit 200 in the present embodiment is 0.77 times the charge/discharge frequency fa of the booster circuit 300 in the comparative example. Therefore, according to the present embodiment, the charge/discharge frequency can be reduced. Specifically, current consumption accompanying switching of the switching element can be reduced due to reduction of the frequency of the switch control signal.

The third advantage obtained by providing the capacitors of the booster circuit 200 in the present embodiment in the semiconductor device is as follows.

Specifically, in comparison with the booster circuit 300 in the comparative example, when the capacitors are formed in the semiconductor device for the booster circuit 200 in the present embodiment with the same cost as to obtain the same output impedance (same capability) and the booster circuit 300 in the comparative example, the charge/discharge current due to the parasitic capacitance of the capacitor can be reduced by the booster circuit 200 in the present embodiment.

Figure 14:
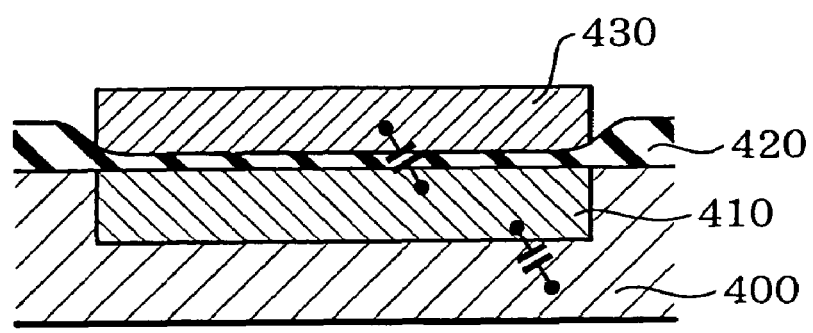
FIG. 14 is illustrative of a parasitic capacitance of a capacitor provided in a semiconductor device.

FIG. 14 shows an explanatory diagram of the parasitic capacitance of the capacitor provided in the semiconductor device. In the case of providing the capacitor in the semiconductor device, an n-type well region 410 (impurity region in a broad sense) is formed in a p-type silicon substrate 400 (semiconductor substrate in a broad sense) which makes up the semiconductor device. An insulating oxide film 420 (insulating layer in a broad sense) is formed on the n-type well region 410. A polysilicon film 430 (conductive layer in a broad sense) is formed on the insulating oxide film 420.

A capacitor is formed by the n-type well region 410, the polysilicon film 430 and the insulating oxide film 420. A junction capacitance between the p-type silicon substrate 400 and the n-type well region 410 becomes the parasitic capacitance.

In the booster circuit 300 in the comparative example, a voltage $\Delta V$ is charged/discharged to or from all the capacitors C1 to C4 as the flying capacitors, as shown in FIG. 10. In FIG. 10, the parasitic capacitances of the capacitors C1 to C4 are denoted by Cx1 to Cx4. If the parasitic capacitance per unit area is Ci, the charge/discharge current Ia due to the parasitic capacitance is expressed by the following equation.

$$Ia = Ci \cdot S \cdot V \cdot fa \tag{16}$$

In the booster circuit 200 in the present embodiment, the stabilization capacitors are not repeatedly charged/discharged, and only the boost capacitors are repeatedly charged/discharged. Therefore, the parasitic capacitances of four capacitors among the eight capacitors generate the charge/discharge current. In FIG. 5, the parasitic capacitances of the first to fourth boost capacitors Cu1 to Cu4 are denoted by Cy1 to Cy4. The charge/discharge current Ib due to the parasitic capacitances Cy1 to Cy4 of the first to fourth boost capacitors Cu1 to Cu4 is expressed by the following equation.

$$Ib = Ci \cdot (S/2) \cdot V \cdot fb \tag{17}$$

The relationship between Ia and Ib is calculated from the equations (16) and (17), and substituting the equation (15) yields the following equation.

$$Ib = Ia/2 = 0.38 \cdot Ia \tag{18}$$

The equation (18) shows that the charge/discharge current Ib of the parasitic capacitance of the capacitor of the booster circuit 200 in the present embodiment is 0.38 times the charge/discharge current Ia of the parasitic capacitance of the capacitor of the booster circuit 300 in the comparative example. Therefore, according to the present embodiment, the charge/discharge current due to the parasitic capacitance of the capacitor can be significantly reduced.

As described above, current consumption can be significantly reduced in comparison with the booster circuit 300 in the comparative example by providing the capacitors in the configuration of the present embodiment in the semiconductor device.

2.4 Voltage Regulation

In the booster circuit 200 of the semiconductor device 100 in the present embodiment, the voltage boosted by the booster circuit 200 may be regulated by regulating the voltage between the first and second power supply lines of the booster circuit 200 as described below.

Figure 15:
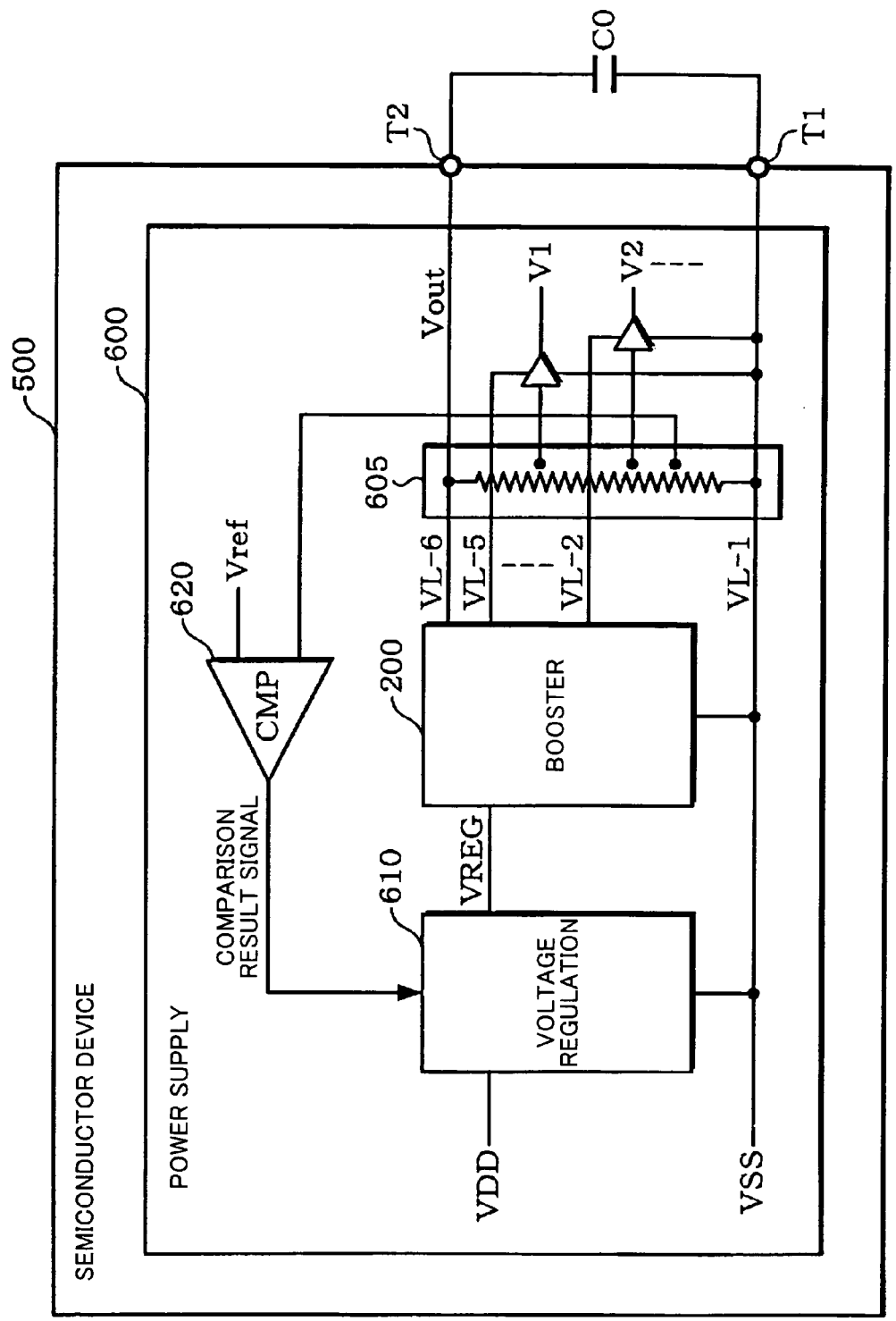
FIG. 15 is a configuration diagram of a first configuration example of a semiconductor device which includes a power supply circuit which outputs a voltage obtained by regulating a boosted voltage of a booster circuit.

FIG. 15 shows an outline of a first configuration example of a semiconductor device which includes a power supply circuit which outputs a voltage obtained by regulating the boosted voltage of the booster circuit. In FIG. 15, sections the same as the sections of the semiconductor device 100 shown in FIG. 5 are denoted by the same symbols. Description of these sections is appropriately omitted.

A semiconductor device 500 shown in FIG. 15 includes a power supply circuit 600. The power supply circuit 600 includes the booster circuit 200 shown in FIG. 5, and outputs one or more voltages (V1, V2, . . . ) obtained by regulating the boosted voltage of the booster circuit 200.

The semiconductor device 500 includes the first and second terminals T1 and T2 in the same manner as the semiconductor device 100 shown in FIG. 5. The first and sixth power supply lines VL-1 and VL-6 of the booster circuit 200 are respectively connected with the first and second terminals T1 and T2. The capacitor C0 is connected (externally provided) between the first and second terminals T1 and T2 outside the semiconductor device 500.

The power supply circuit 600 includes a multi-valued voltage generation circuit 605. The multi-valued voltage generation circuit 605 generates the multi-valued voltages V1, V2, . . . based on the voltage between the first and sixth power supply lines VL-1 and VL-6 (first and (N+1)th power supply lines in a broad sense). The multi-valued voltage generation circuit 605 regulates intermediate voltages of the second to fifth power supply lines VL-2 to VL-5 by using a regulator, and outputs the regulated voltages as the multi-valued voltages V1, V2, . . . The multi-valued voltages generated by the multi-valued voltage generation circuit 605 are used to drive an electro-optical device, for example.

Specifically, the boosted voltage output to the sixth power supply line VL-6 is directly output from the power supply circuit 600. This is because the output voltage Vout is stabilized by the stabilization capacitor Cs4 of the booster circuit 200, as shown in FIG. 5. The power supply circuit 600 includes a voltage regulation circuit 610 and a comparison circuit 620. The voltage regulation circuit 610 outputs a regulated voltage VREG obtained by regulating the voltage between the high-potential-side voltage system power supply voltage VDD and the low-potential-side ground power supply voltage VSS. The regulated voltage VREG is supplied to the second power supply line VL-2 of the booster circuit 200.

The comparison circuit 620 compares a reference voltage Vref with the divided voltage based on the boosted voltage of the booster circuit 200, and outputs the comparison result to the voltage regulation circuit 610. In more detail, the comparison circuit 620 compares the reference voltage Vref with the divided voltage obtained by dividing the voltage between the first and sixth power supply lines VL-1 and VL-6 (first and (N+1)th power supply lines in a broad sense), and outputs a comparison result signal corresponding to the comparison result. The voltage regulation circuit 610 outputs the regulated voltage VREG obtained by regulating the voltage between the high-potential-side system power supply voltage VDD and the low-potential-side ground power supply voltage VSS based on the comparison result signal from the comparison circuit 620.

Figure 16:
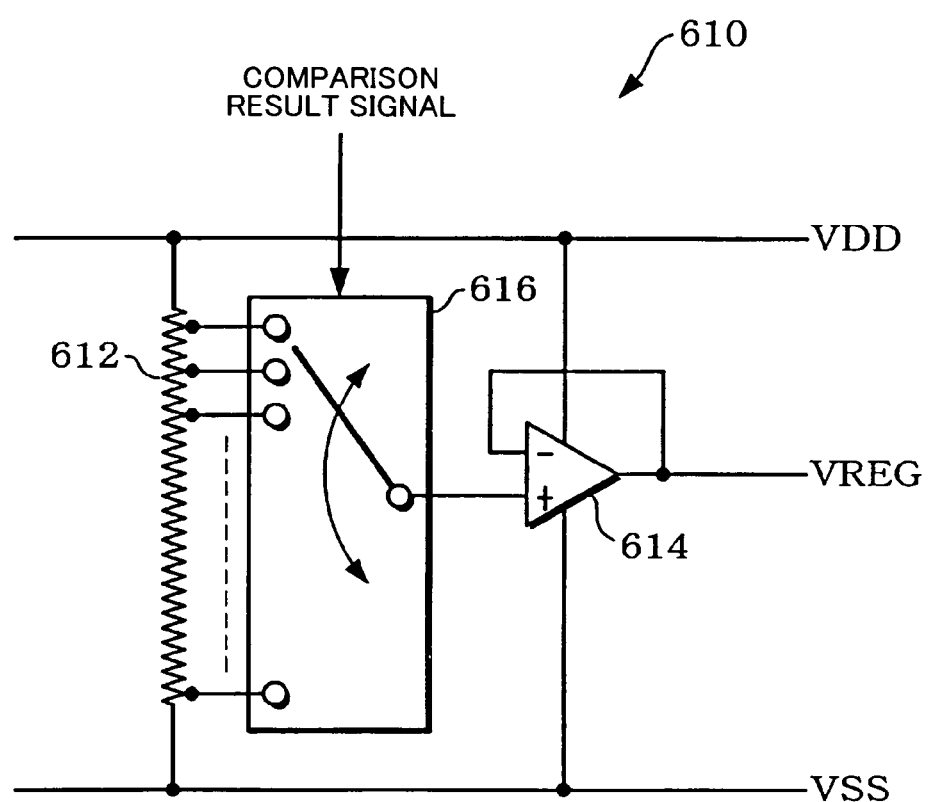
FIG. 16 is a block diagram of a configuration example of a voltage regulation circuit.

FIG. 16 shows a configuration example of the voltage regulation circuit 610. The voltage regulation circuit 610 includes a voltage divider circuit 612, a voltage-follower-connected operational amplifier 614, and a switch circuit 616.

The voltage divider circuit 612 includes a resistance element connected between the system power supply voltage VDD and the ground power supply voltage VSS, and outputs one of the divided voltages of the voltage between the system power supply voltage VDD and the ground power supply voltage VSS.

The operational amplifier 614 is connected between the system power supply voltage VDD and the ground power supply voltage VSS. The operational amplifier 614 outputs the regulated voltage VREG. The output of the operational amplifier 614 is negatively fed back.

The switch circuit 616 connects the voltage dividing point of the voltage divider circuit 612 with the input of the operational amplifier 614. The switch circuit 616 connects one of the voltage dividing points of the voltage divider circuit 612 with the input of the operational amplifier 614 based on the comparison result signal from the comparison circuit 620.

In FIGS. 15 and 16, the voltage is regulated based on the comparison result between the divided voltage obtained by dividing the voltage between the first and (N+ 1)th power supply lines and the reference voltage. However, the present invention is not limited thereto. For example, the voltage may be regulated based on the comparison result between the reference voltage Vref and the output voltage (Vout).

Figure 17:
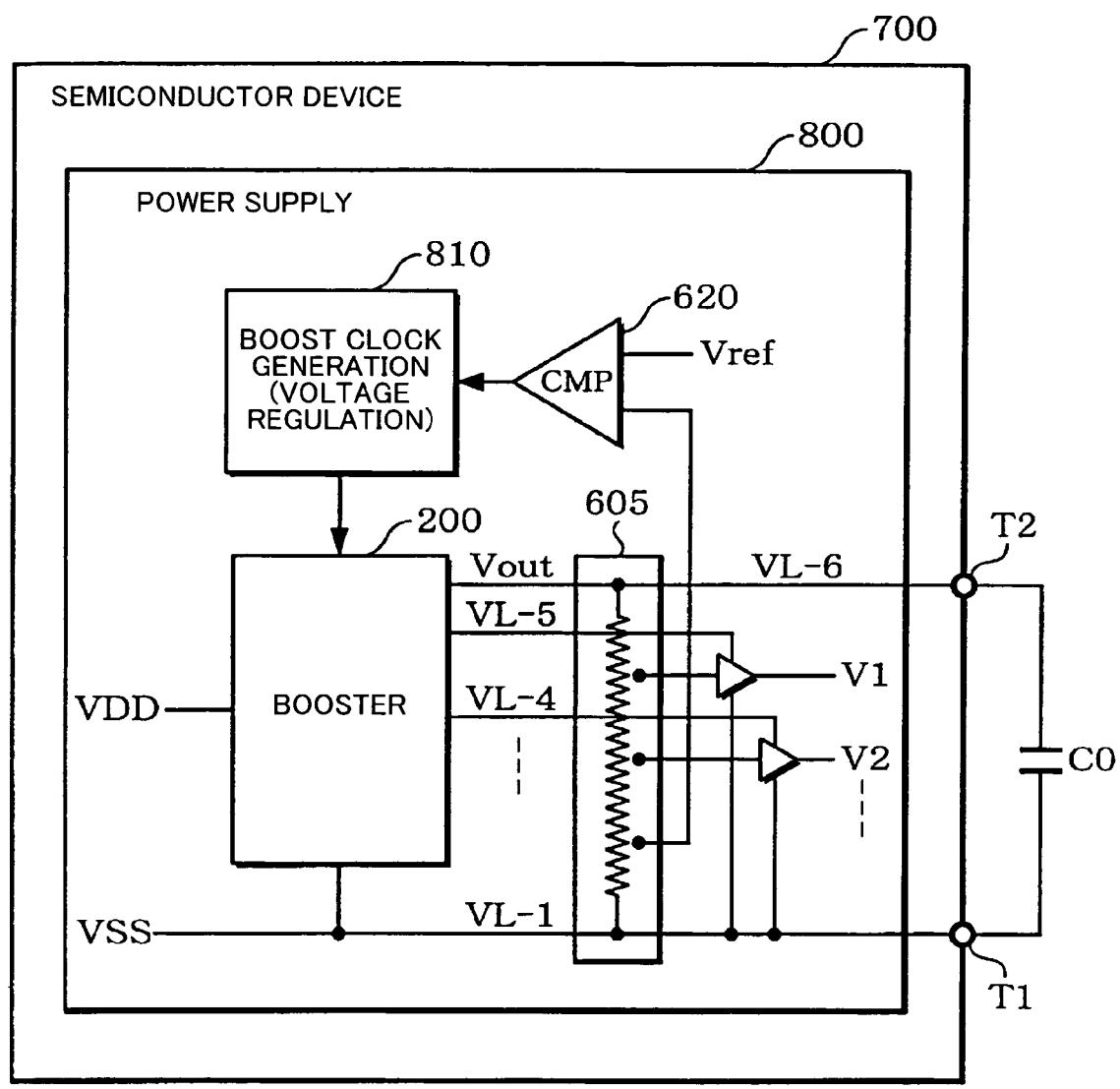
FIG. 17 is a configuration diagram of a second configuration example of a semiconductor device which includes a power supply circuit which outputs a voltage obtained by regulating a boosted voltage of a booster circuit.

FIG. 17 shows an outline of a second configuration example of a semiconductor device which includes a power supply circuit which outputs voltage obtained by regulating the boosted voltage of the booster circuit. In FIG. 17, sections the same as the sections of the semiconductor device 500 shown in FIG. 15 are denoted by the same symbols. Description of these sections is appropriately omitted.

A semiconductor device 700 shown in FIG. 17 includes a power supply circuit 800. The power supply circuit 800 includes the booster circuit 200 shown in FIG. 5 in the same manner as the power supply circuit 600 shown in FIG. 15, and outputs one or more voltages (V1, V2, ...) obtained by regulating the boosted voltage of the booster circuit 200.

The power supply circuit 800 includes a multi-valued voltage generation circuit 605, a comparison circuit 620, and a boost clock generation circuit 810 (voltage regulation circuit in a broad sense). The boost clock generation circuit 810 changes the frequencies of boost clock signals (switch control signals S1 to S10) based on the comparison result from the comparison circuit 620. In more detail, the boost clock generation circuit 810 changes the frequencies of the switch control signals for on/off controlling of the MOS transistors (first to 2N-th switching elements in a broad sense) as the first to tenth switching elements in the booster circuit 200 based on the comparison result between the reference voltage Vref and the divided voltage obtained by dividing the voltage between the first and sixth power supply lines VL-1 and VL-6 (first and (N+1)th power supply lines in a broad sense).

For example, the boost clock generation circuit 810 increases the frequency of the switch control signal so that the output voltage Vout is increased. The boost clock generation circuit 810 decreases the frequency of the switch control signal so that the output voltage Vout is decreased.

3. Application of Display Device

An example of the application of the semiconductor device, including the booster circuit, to a display device is described below.

Figure 18:
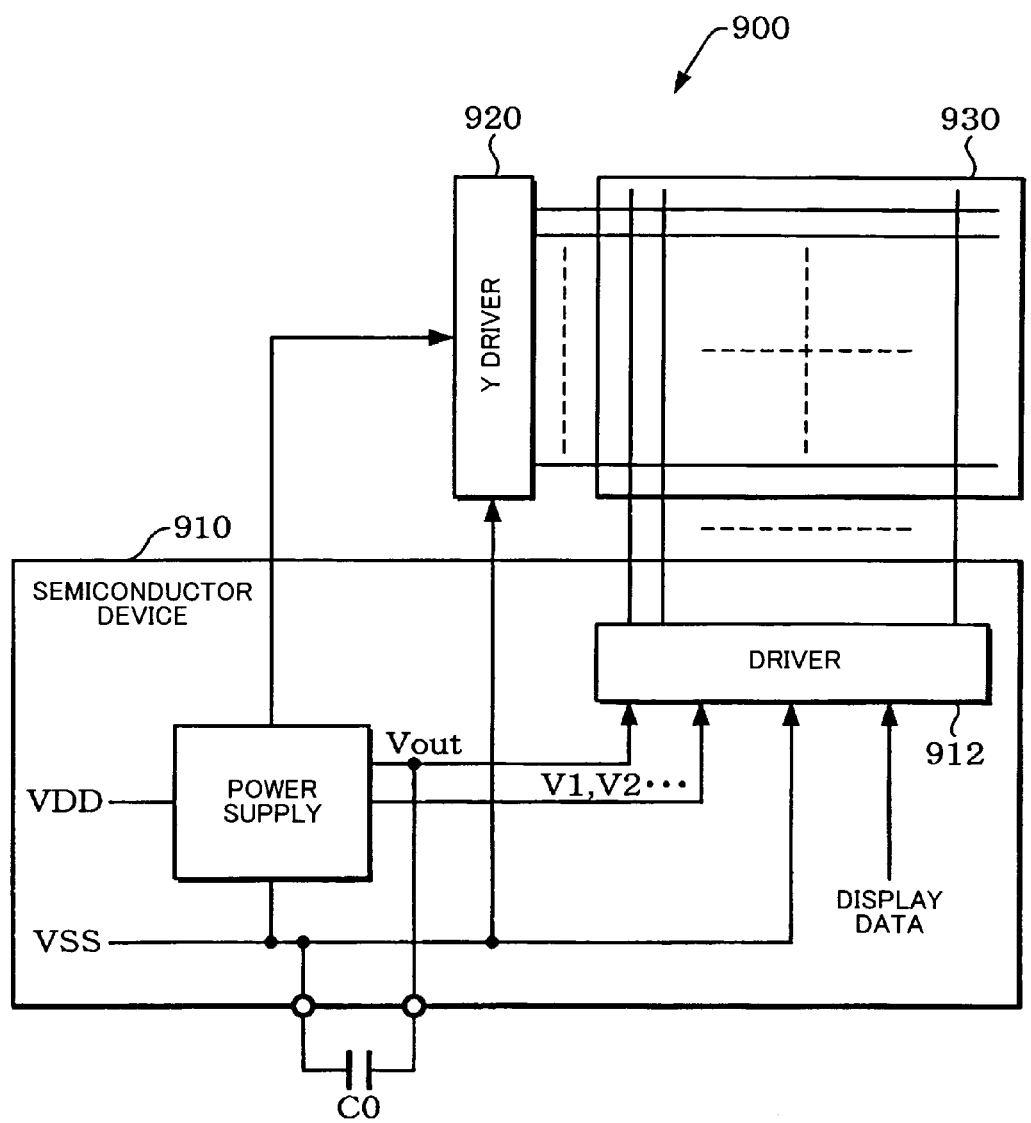
FIG. 18 is a diagram of a configuration example of a display device.

FIG. 18 shows a configuration example of a display device. FIG. 18 shows a configuration example of a liquid crystal display device as a display device.

A liquid crystal display device 900 includes a semiconductor device 910, a Y driver 920 (scan driver in a broad sense), and a liquid crystal display panel 930 (electro-optical device in a broad sense).

At least one of the semiconductor device 910 and the Y driver 920 may be formed on a panel substrate of the liquid crystal display panel 930. The Y driver 920 may be included in the semiconductor device 910.

The liquid crystal display panel 930 includes a plurality of scan lines, a plurality of data lines, and a plurality of pixels. Each pixel is disposed corresponding to the intersecting point of the scan line and the data line. The scan lines are scanned by the Y driver 920. The data lines are driven by the semiconductor device 910. Specifically, the semiconductor device 910 is applied to a data driver.

As the semiconductor device 910, the semiconductor device 500 shown in FIG. 15 or the semiconductor device 700 shown in FIG. 17 may be employed. In this case, the semiconductor device 910 includes a driver section 912.

The driver section 912 drives the liquid crystal display panel 930 (electro-optical device) by using the voltage between the first and (N+1)th power supply lines. In more detail, multi-valued voltages generated by a power supply circuit (power supply circuit 600 or power supply circuit 800) is supplied to the driver section 912. The driver section 912 selects a voltage corresponding to display data from the multi-valued voltages, and outputs the selected voltage to the data line of the liquid crystal display panel 930.

A high voltage is generally necessary in the Y driver 920. The power supply circuit of the semiconductor device 910 supplies a high voltage such as +15V or −15 V to the Y driver 920. The power supply circuit supplies the output voltage Vout or the intermediate voltage V1, V2, . . . (or voltage obtained by regulating the intermediate voltage) to the driver section 912.

As examples of electronic instruments including the liquid crystal display device having such a configuration, a multimedia personal computer (PC), portable telephone, word processor, TV, view finder or direct view finder video tape recorder, electronic notebook, electronic desk calculator, car navigation system, wrist watch, clock, POS terminal, device provided with a touch panel, pager, minidisc player, IC card, remote controller for various electronic instruments, various measurement devices, and the like can be given.

As the liquid crystal display panel 930, a simple matrix liquid crystal display panel and a static drive liquid crystal display panel in which a switching element is not used for the panel, or an active matrix liquid crystal display panel using a three-terminal switching element represented by a TFT or a two-terminal switching element represented by an MIM may be used from the viewpoint of the drive method. From the viewpoint of electro-optical characteristics, various types of liquid crystal panels such as a TN type, STN type, guest-host type, phase transition type, and ferroelectric type liquid crystal panel may be used.

The above description illustrates the case where the LCD display is used as the liquid crystal display panel. However, the present invention is not limited thereto. For example, various display devices such as an electroluminescent panel, plasma display panel, or field emission display (FED) panel may be used.

The present invention is not limited to the above-described embodiment. Various modifications and variations are possible within the spirit and scope of the present invention.

The case where an additional device is included between the switching elements or between the capacitors in FIGS. 1, 2, 5, and 15 to 18 is also included in the equivalent range of the present invention.

Part of requirements of any claim of the present invention could be omitted from a dependent claim which depends on that claim. Moreover, part of requirements of any independent claim of the present invention could be made to depend on any other independent claim.

There can be provided embodiments of the present invention having features as follows.

A booster circuit having a plurality of capacitors according to one embodiment of the present invention includes:

first to M-th power supply lines (M is an integer greater than three);

first to (M−2)th boost capacitors, the j-th boost capacitor ($1 \leq j \leq M-2$, j is an integer) being connected between the j-th power supply line and the (j+1)th power supply line in a first period, and connected between the (j+1)th power supply line and the (j+2)th power supply line in a second period which is subsequent to the first period; and first to (M−3)th stabilization capacitors, the k-th stabilization capacitor ($1 \leq k \leq M-3$, k is an integer) being connected between the (k+1)th power supply line and the (k+2)th power supply line, and storing an electric charge discharged from the k-th boost capacitor in the second period, wherein a voltage obtained by multiplying a voltage between the first and second power supply lines (M−1) times is output between the first and M-th power supply lines.

This booster circuit may further include an (M−2)th stabilization capacitor connected between the (M−1)th power supply line and the M-th power supply line, and the (M−2)th stabilization capacitor may store an electric charge discharged from the (M−2)th boost capacitor in the second period.

This booster circuit may include an output capacitor connected between the first power supply line and the M-th power supply line.

A booster circuit having a plurality of capacitors according to another embodiment of the present invention includes:

first to (N+1)th power supply lines (N is an integer greater than two);

first to 2N-th switching elements, one end of the first switching element being connected with the first power supply line, one end of the 2N-th switching element being connected with the (N+1)th power supply line, and the switching elements other than the first and 2N-th switching elements being connected in series between the other end of the first switching element and the other end of the 2N-th switching element;

first to (N−1)th boost capacitors, one end of each of the boost capacitors being connected with a j-th connection node ($1 \leq j \leq 2N-3$, j is an odd number) to which the j-th and (j+1)th switching elements are connected, and the other end of the boost capacitor being connected with a (j+2)th connection node to which the (j+2)th and (j+3)th switching elements are connected; and first to (N−2)th stabilization capacitors, one end of each of the stabilization capacitors being connected with a k-th connection node ($2 \leq k \leq 2N-4$, k is an even number) to which the k-th and (k+1)th switching elements are connected, and the other end of the stabilization capacitor being connected with a (k+2)th connection node to which the (k+2)th and (k+3)th switching elements are connected, wherein the switching elements are controlled so that one of the m-th switching element ($1 \leq m \leq 2N-1$, m is an integer) and the (m+1)th switching element is turned on, and a voltage obtained by multiplying a voltage between the first and second power supply lines N times is output between the first and (N+1)th power supply lines.

This booster circuit may further include an (N−1)th stabilization capacitor connected between the N-th power supply line and the (N+1)th power supply line, and the (N−1)th stabilization capacitor may store an electric charge discharged from the (N−1)th boost capacitor in the second period.

This booster circuit may include an output capacitor connected between the first power supply line and the (N+1)th power supply line.

With this booster circuit, the voltage between the first and second power supply lines may be applied to each of the boost capacitors and each of the stabilization capacitors.

According to these embodiments of the present invention, a low voltage can be applied to each constituent element of the booster circuit. Therefore, manufacturing cost can be reduced.

A semiconductor device including a plurality of capacitors according to a further embodiment of the present invention includes:

first to (N+1)th power supply lines (N is an integer greater than two);

first to 2N-th switching elements, one end of the first switching element being connected with the first power supply line, one end of the 2N-th switching element being connected with the (N+1)th power supply line, and the switching elements other than the first and 2N-th switching elements being connected in series between the other end of the first switching element and the other end of the 2N-th switching element;

first to (N−1)th boost capacitors, one end of each of the boost capacitors being connected with a j-th connection node ($1 \leq j \leq 2N-3$, j is an odd number) to which the j-th and (j+1)th switching elements are connected, and the other end of the boost capacitor being connected with a (j+2)th connection node to which the (j+2)th and (j+3)th switching elements are connected; and first to (N−2)th stabilization capacitors, one end of each of the stabilization capacitors being connected with a k-th connection node ($2 \leq k \leq 2N-4$, k is an even number) to which the k-th and (k+1)th switching elements are connected, and the other end of the stabilization capacitor being connected with a (k+2)th connection node to which the (k+2)th and (k+3)th switching elements are connected, wherein the switching elements are controlled so that one of the m-th switching element ($1 \leq m \leq 2N-1$, m is an integer) and the (m+1)th switching element is turned on.

This semiconductor device may further include an (N−1)th stabilization capacitor connected between the N-th power supply line and the (N+1)th power supply line, and the (N−1)th stabilization capacitor may store an electric charge discharged from the (N−1)th boost capacitor in the second period.

This semiconductor device may include first and second terminals electrically connected with the first and (N+1)th power supply lines, respectively, and a capacitor may be connected between the first terminal and the second terminal outside the semiconductor device.

According to these embodiments of the present invention, the switching element, the boost capacitor, and the stabilization capacitor which form the booster circuit can be formed by a low-voltage manufacturing process. Moreover, in the case of realizing the switching element by using a conventional MOS transistor, since the MOS transistor can be manufactured by the low-voltage manufacturing process, the charge/discharge current due to the gate capacitance of the MOS transistor can be reduced.

Furthermore, in comparison with a conventional charge-pump type booster circuit, when the capacitors are formed in the semiconductor device with the same cost and same area as such a conventional charge-pump type booster circuit to obtain the same output impedance (same capability) as the conventional charge-pump type booster circuit, current consumption accompanying switching can be reduced, since the charge/discharge frequencies of the capacitors can be reduced. In addition, since the capacitor can be formed by using the low-voltage manufacturing process, the charge/discharge current due to the parasitic capacitance of the capacitor can be significantly reduced.

This semiconductor device may include a voltage regulation circuit which regulates voltage, and voltage regulated by the voltage regulation circuit may be supplied as a voltage between the first and second power supply lines.

With this semiconductor device, the voltage regulation circuit may regulate voltage based on a comparison result between a reference voltage and a voltage between the first and (N+1)th power supply lines or a comparison result between the reference voltage and a divided voltage obtained by dividing the voltage between the first and (N+1)th power supply lines.

This semiconductor device may include a voltage regulation circuit which changes frequencies of switch control signals based on a comparison result between a reference voltage and a divided voltage obtained by dividing a voltage between the first and (N+1)th power supply lines, the switch control signals being used for controlling the first to 2N-th switching elements to be turned on and off.

According to these embodiments of the present invention, a reduction of cost and power consumption of the semiconductor device which generates a boosted voltage with high accuracy can be realized.

This semiconductor device may include a multi-valued voltage generation circuit which generates multi-valued voltages based on a voltage between the first and (N+1)th power supply lines.

This semiconductor device may include a driver section which drives an electro-optical device based on the multi-valued voltages generated by the multi-valued voltage generation circuit.

According to these embodiments of the present invention, since the drive voltage can be generated with high accuracy, a semiconductor device which realizes high display quality drive can be provided.

With this semiconductor device, the voltage between the first and second power supply lines may be applied to each of the boost capacitors and each of the stabilization capacitors.

A display device according to a still further embodiment of the present invention includes: a plurality of scan lines; a plurality of data lines; a plurality of pixels; a scan driver which drives the scan lines; and the above semiconductor device which drives the data lines.

According to this embodiment of the present invention, a display device with a reduced cost and power consumption can be provided by reducing cost and power consumption of the semiconductor device.

What is claimed is:

1. A booster circuit including a plurality of capacitors, the booster circuit comprising:
   first to M-th power supply lines (M is an integer greater than three);
   first to (M−2)th boost capacitors, the j-th boost capacitor ($1 \leq j \leq M-2$, j is an integer) being connected between the j-th power supply line and the (j+1)th power supply line in a first period, and connected between the (j+1)th power supply line and the (j+2)th power supply line in a second period which is subsequent to the first period; and
   first to (M−3)th stabilization capacitors, the k-th stabilization capacitor ($1 \leq k \leq M-3$, k is an integer) being connected between the (k+1)th power supply line and the (k+2)th power supply line, and storing an electric charge discharged from the k-th boost capacitor in the second period,
   wherein a voltage obtained by multiplying a voltage between the first and second power supply lines (M−1) times is output between the first and M-th power supply lines.

2. The booster circuit as defined in claim 1, further comprising:
   an (M−2)th stabilization capacitor connected between the (M−1)th power supply line and the M-th power supply line,
   wherein the (M−2)th stabilization capacitor stores an electric charge discharged from the (M−2)th boost capacitor in the second period.

3. The booster circuit as defined in claim 1, comprising an output capacitor connected between the first power supply line and the M-th power supply line.

4. The booster circuit as defined in claim 1, wherein the voltage between the first and second power supply lines is applied to each of the boost capacitors and each of the stabilization capacitors.

5. A booster circuit including a plurality of capacitors, the booster circuit comprising:
   first to (N+1)th power supply lines (N is an integer greater than two);
   first to 2N-th switching elements, one end of the first switching element being connected with the first power supply line, one end of the 2N-th switching element being connected with the (N+1)th power supply line, and the switching elements other than the first and 2N-th switching elements being connected in series between the other end of the first switching element and the other end of the 2N-th switching element;
   first to (N−1)th boost capacitors, one end of each of the boost capacitors being connected with a j-th connection node ($1 \leq j \leq 2N-3$, j is an odd number) to which the j-th and (j+1)th switching elements are connected, and the other end of the boost capacitor being connected with a (j+2)th connection node to which the (j+2)th and (j+3)th switching elements are connected; and
   first to (N−2)th stabilization capacitors, one end of each of the stabilization capacitors being connected with a k-th connection node ($2 \leq k \leq 2N-4$, k is an even number) to which the k-th and (k+1)th switching elements are connected, and the other end of the stabilization capacitor being connected with a (k+2)th connection node to which the (k+2)th and (k+3)th switching elements are connected, wherein the switching elements are controlled so that one of the m-th switching element ($1 \leq m \leq 2N-1$, m is an integer) and the (m+1)th switching element is turned on, and a voltage obtained by multiplying a voltage between the first and second power supply lines N times is output between the first and (N+1)th power supply lines.

6. The booster circuit as defined in claim 5, further comprising:
an (N−1)th stabilization capacitor connected between the N-th power supply line and the (N+1)th power supply line,
wherein the (N−1)th stabilization capacitor stores an electric charge discharged from the (N−1)th boost capacitor in the second period.

7. The booster circuit as defined in claim 5, comprising an output capacitor connected between the first power supply line and the (N+1)th power supply line.

8. The booster circuit as defined in claim 5, wherein the voltage between the first and second power supply lines is applied to each of the boost capacitors and each of the stabilization capacitors.

9. A semiconductor device including a plurality of capacitors, the semiconductor device comprising:
first to (N+1)th power supply lines (N is an integer greater than two);
first to 2N-th switching elements, one end of the first switching element being connected with the first power supply line, one end of the 2N-th switching element being connected with the (N+1)th power supply line, and the switching elements other than the first and 2N-th switching elements being connected in series between the other end of the first switching element and the other end of the 2N-th switching element;
first to (N−1)th boost capacitors, one end of each of the boost capacitors being connected with a j-th connection node ($1 \leq j \leq 2N-3$, j is an odd number) to which the j-th and (j+1)th switching elements are connected, and the other end of the boost capacitor being connected with a (j+2)th connection node to which the (j+2)th and (j+3)th switching elements are connected; and
first to (N−2)th stabilization capacitors, one end of each of the stabilization capacitors being connected with a k-th connection node ($2 \leq k \leq 2N-4$, k is an even number) to which the k-th and (k+1)th switching elements are connected, and the other end of the stabilization capacitor being connected with a (k+2)th connection node to which the (k+2)th and (k+3)th switching elements are connected,
wherein the switching elements are controlled so that one of the m-th switching element ($1 \leq m \leq 2N-1$, m is an integer) and the (m+1)th switching element is turned on.

10. The semiconductor device as defined in claim 9, further comprising:
an (N−1)th stabilization capacitor connected between the N-th power supply line and the (N+1)th power supply line,
wherein the (N−1)th stabilization capacitor stores an electric charge discharged from the (N−1)th boost capacitor in the second period.

11. The semiconductor device as defined in claim 9, comprising:
first and second terminals electrically connected with the first and (N+1)th power supply lines, respectively,
wherein a capacitor is connected between the first terminal and the second terminal outside the semiconductor device.

12. The semiconductor device as defined in claim 9, comprising:
a voltage regulation circuit which regulates voltage,
wherein voltage regulated by the voltage regulation circuit is supplied as a voltage between the first and second power supply lines.

13. The semiconductor device as defined in claim 12, wherein the voltage regulation circuit regulates voltage based on a comparison result between a reference voltage and a voltage between the first and (N+1)th power supply lines or a comparison result between the reference voltage and a divided voltage obtained by dividing the voltage between the first and (N+1)th power supply lines.

14. The semiconductor device as defined in claim 9, comprising a voltage regulation circuit which changes frequencies of switch control signals based on a comparison result between a reference voltage and a divided voltage obtained by dividing a voltage between the first and (N+1)th power supply lines, the switch control signals being used for controlling the first to 2N-th switching elements to be turned on and off.

15. The semiconductor device as defined in claim 9, comprising a multi-valued voltage generation circuit which generates multi-valued voltages based on a voltage between the first and (N+1)th power supply lines.

16. The semiconductor device as defined in claim 15, comprising a driver section which drives an electro-optical device based on the multi-valued voltages generated by the multi-valued voltage generation circuit.

17. The semiconductor device as defined in claim 9, wherein the voltage between the first and second power supply lines is applied to each of the boost capacitors and each of the stabilization capacitors.

18. A display device, comprising:
a plurality of scan lines;
a plurality of data lines;
a plurality of pixels;
a scan driver which drives the scan lines; and
the semiconductor device as defined in claim 16 which drives the data lines.

* * * * *